US012749478B2

(12) United States Patent
Xie et al.

(10) Patent No.: US 12,749,478 B2
(45) Date of Patent: Sep. 29, 2026

(54) ENHANCED SPEECH-TO-TEXT PERFORMANCE WITH MIXED LANGUAGES

(71) Applicant: The Hong Kong University of Science and Technology, Kowloon (HK)

(72) Inventors: Peng Xie, Clear Water Bay (HK); Tsz Wai Chan, Chaiwan (HK); Xingyuan Liu, Guangdong (CN); Kani Chen, Clear Water Bay (HK); Yang Wang, Clear Water Bay (HK)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 159 days.

(21) Appl. No.: 18/902,500

(22) Filed: Sep. 30, 2024

(65) Prior Publication Data

US 2025/0131915 A1 Apr. 24, 2025

Related U.S. Application Data

(60) Provisional application No. 63/592,912, filed on Oct. 24, 2023.

(51) Int. Cl.

| | |
|---|---|
| ***G10L 15/06*** | (2013.01) |
| ***G10L 15/18*** | (2013.01) |
| ***G10L 15/26*** | (2006.01) |

(52) U.S. Cl.

CPC ........ *G10L 15/063* (2013.01); *G10L 15/1822* (2013.01); *G10L 15/26* (2013.01)

(58) Field of Classification Search

CPC ... G10L 15/063; G10L 15/1822; G10L 15/26; G10L 15/01; G10L 13/02; G10L 15/02;

(Continued)

(56) References Cited

U.S. PATENT DOCUMENTS

| | | | |
|---|---|---|---|
| 7,502,731 | B2 | 3/2009 | Emonts et al. |
| 11,531,846 | B1 | 12/2022 | Bodapati et al. |

(Continued)

FOREIGN PATENT DOCUMENTS

| | | | |
|---|---|---|---|
| CN | 113205795 | A | 8/2021 |
| CN | 115064154 | A | 9/2022 |

(Continued)

OTHER PUBLICATIONS

Li et al., "Multilingual Speech Translation from Efficient Finetuning of Pretrained Models", Proceedings of the 59th Annual Meeting of the Association for Computational Linguistics and the 11th International Joint Conference on Natural Language Processing, Aug. 1-6, 2021, pp. 827-838.

(Continued)

*Primary Examiner* — Darioush Agahi

(74) *Attorney, Agent, or Firm* — Amin, Turocy & Watson, LLP

(57) ABSTRACT

Training a mixed language speech recognition model, and speech recognition performed by the model, can be enhanced. Model manager can control training and/or operation of the model. Mixed language data generation manager can generate an enhanced mixed language dataset that can enhance training of the model. Fine tuner can facilitate configuring hyperparameters of the model. Audio-based information and transcript that are representative of the dataset can be applied to the model to facilitate model training. FAL evaluator can determine fidelity, accuracy, and latency of performance of speech recognition on the audio-based information and transcript by the model. Based on such determination, mixed language data generation process and/or hyperparameters can be updated to enhance further training of the model to enhance fidelity, accuracy, and/or latency regarding performance of speech recognition by the (Continued)

model. Model manager can control one or more iterations of model training.

20 Claims, 12 Drawing Sheets

(58) Field of Classification Search
CPC .. G10L 15/16; G10L 15/22; G10L 2015/0635
See application file for complete search history.

(56) References Cited

U.S. PATENT DOCUMENTS

| | | | | |
|---|---|---|---|---|
| 2005/0038654 | A1 | 2/2005 | Emonts et al. | |
| 2010/0304342 | A1* | 12/2010 | Zilber | G10L 15/26 434/157 |
| 2016/0316059 | A1* | 10/2016 | Nuta | G06N 7/01 |
| 2019/0378497 | A1* | 12/2019 | Lichun | G10L 15/063 |
| 2022/0293092 | A1 | 9/2022 | Ding et al. | |
| 2022/0358913 | A1* | 11/2022 | Rao | G06F 40/279 |
| 2023/0030822 | A1* | 2/2023 | Nieuwegiessen | H04L 51/56 |
| 2025/0118285 | A1* | 4/2025 | Bansal | G10L 13/10 |

FOREIGN PATENT DOCUMENTS

| | | | |
|---|---|---|---|
| CN | 115394287 | A | 11/2022 |
| CN | 116386609 | A | 7/2023 |
| CN | 116468055 | A | 7/2023 |
| CN | 117313715 | A | 12/2023 |
| CN | 112133295 | B | 2/2024 |
| TW | I659411 | B | 5/2019 |

OTHER PUBLICATIONS

Fatouros et al., "Transforming Sentiment Analysis in the Financial Domain with ChatGPT", Machine Learning with Applications, vol. 14, No. 100508, 2023, 13 pages.
Ardila et al., "Common Voice: a Massively-Multilingual Speech Corpus", arXiv:1912.06670v1, Dec. 13, 2019, 5 pages.
Anu et al., "Education in the Era of Generative Artificial Intelligence (AI): Understanding the Potential Benefits of ChatGPT in Promoting Teaching and Learning", Journal of AI, vol. 7, Issue No. 1, Dec. 31, 2023, pp. 52-62.
Chan et al., "SpeechStew: Simply Mix All Available Speech Recognition Data to Train One Large Neural Network", arXiv:2104.02133v3, Apr. 27, 2021, 5 pages.
Chen et al., "Developing Real-time Streaming Transformer Transducer for Speech Recognition on Large-scale Dataset", In ICASSP 2021-2021 IEEE International Conference on Acoustics, Speech and Signal Processing (ICASSP), arXiv:2010.11395v3, Feb. 28, 2021, 5 pages.
Rio et al., "Earnings-21: a Practical Benchmark for ASR in the Wild", arXiv:2104.11348v3, Jun. 16, 2021, 5 pages.
Rio et al., "Earnings-22: a Practical Benchmark for Accents in the Wild", arXiv:2203.15591v1, Mar. 29, 2022, 5 pages.
Gulati et al., "Conformer: Convolution-augmented Transformer for Speech Recognition", arXiv:2005.08100v1, May 16, 2020, 5 pages.
Gunasekar et al., "Textbooks are All You Need", arXiv:2306.11644v2, Oct. 2, 2023, 26 pages.
Hernandez et al., "TED-LIUM 3: Twice as Much Data and Corpus Repartition for Experiments on Speaker Adaptation", SPECOM, 2018, pp. 198-208.
Hinton et al., "Deep Neural Networks for Acoustic Modeling in Speech Recognition: the Shared Views of Four Research Groups", IEEE Signal Processing Magazine, Nov. 2012, pp. 82-97.
Klakow et al., "Testing the Correlation of Word Error Rate and Perplexity", Speech Communication, vol. 38, Issue No. 1-2, Sep. 2002, pp. 19-28.
Kuchaiev et al., "NeMo: a Toolkit for Building AI Applications using Neural Modules", arXiv:1909.09577v1, Sep. 14, 2019, 8 pages.
Li, Jinyu, "Recent Advances in End-to-End Automatic Speech Recognition", SIP, arXiv:2111.01690v2, Feb. 2, 2022, 27 pages.
Lu et al., "Machine Learning for Synthetic Data Generation: a Review", arXiv:2302.04062v1, Feb. 8, 2023, 17 pages.
Meyer et al., "Artie Bias Corpus: an Open Dataset for Detecting Demographic Bias in Speech Applications", Proceedings of the 12th Conference on Language Resources and Evaluation(LREC 2020), May 11-16, 2020, pp. 6462-6468.
Narayanan et al., "Toward Domain-invariant Speech Recognition via Large Scale Training", IEEE Spoken Language Technology Workshop, 2018, pp. 441-447.
Panayotov et al., "Librispeech: an ASR Corpus Based on Public Domain Audio Books", IEEE International Conference on Acoustics, Speech and Signal Processing(ICASSP), 2015, pp. 5206-5210.
Radford et al., "Robust Speech Recognition via Large-scale Weak Supervision", arXiv:2212.04356v1, Dec. 6, 2022, 28 pages.
Ramesh et al., "Hierarchical Text-Conditional Image Generation with CLIP Latents", arXiv:2204.06125v1, Apr. 13, 2022, 27 pages.
Richardson, Laurie L, "Coral Diseases: What is Really Known?", Trends in Ecology & Evolution, vol. 13, No. 11, Nov. 1, 1998, pp. 438-443.
Touvron et al., "Llama 2: Open Foundation and Fine-tuned Chat Models", arXiv:2307.09288v2, Jul. 19, 2023, 77 pages.
Wang et al., "Self-instruct: Aligning Language Model with Self Generated Instructions", ACL, arXiv:2212.10560v1, Dec. 20, 2022, 19 pages.
Yu et al., "Dual-mode ASR: Unify and Improve Streaming ASR with Full-context Modeling", ICLR, arXiv:2010.06030v2, Jan. 27, 2021, 13 pages.
Zhang et al., "Transformer Transducer: a Streamable Speech Recognition Model with Transformer Encoders and RNN-T Loss", arXiv:2002.02562v2, Feb. 14, 2020, 5 pages.
Zhang et al., "Pushing the Limits of Semi-Supervised Learning for Automatic Speech Recognition", arXiv:2010.10504v1, Oct. 20, 2020, 11 pages.
Zhang et al., "BigSSL: Exploring the Frontier of Large-Scale Semi-Supervised Learning for Automatic Speech Recognition", IEEE Journal of Selected Topics in Signal Processing, vol. 16, No. 6, Oct. 2022, pp. 1519-1532.
Zheng et al., "Judging LLM-as-a-Judge with MT-Bench and Chatbot Arena", 37th Conference on Neural Information Processing Systems, arXiv:2306.05685v4, Dec. 24, 2023, 29 pages.
Zhou et al., "Fine-Tuning Convolutional Neural Networks for Biomedical Image Analysis: Actively and Incrementally", Computer Vision Foundation, 2017, pp. 7340-7351.
Rodríguez et al., "Speech-to-text Recognition for Multilingual Spoken Data in Language Documentation", School of Linguistics and Language Studies, Mar. 2023, 8 pages.
Vuskovic et al., "Mixed Language Speech Recognition", Technical Disclosure Commons, Jun. 12, 2020, 7 pages.
Shetty et al., "Improving the Performance of Transformer Based Low Resource Speech Recognition for Indian Languages", Department of Electrical Engineering, IEEE, 2020, pp. 8279-8283.
Imseng et al., "Towards Mixed Language Speech Recognition Systems", Idiap Research Institute Publication, Jan. 2010, 5 pages.

* cited by examiner

400

408 410

| Model | Audio Recording Related Information | Recognition Result | Latency |
|---|---|---|---|
| 402 Whisper-Large | Original Text：我哋今晚要去嘅酒吧係咪好難搵啊？呢間餐廳嘅菜式真係唔錯，特別係佢嘅燒鵝。呢度交通都算方便，不過搭巴士要留意返工時間。呢個問題唔係咁簡單，要多加思考先得解決。我聽日要去開會，要準備好筆記同報告。 | 我們今晚要去的酒吧是不是很難找呢?這間餐廳的菜式真的不錯，特別是他的燒鵝。這裡溝通也算方便，不過搭巴士要留意上班時間。這個問題不是那麼簡單，要多加思考才能解決。我明天要去開會，要準備好筆記和報告。 | 6.5s |
| 404 Whisper-Small | Audio length：18s | 我們今晚要去的酒吧是不是很難找呢？這間餐廳的菜式真的不錯，特別是它的燒鵝，這裡高通也算方便，不過坐巴士要留意上班時間，這個問題不是那麼簡單，要多加思考才能解決，我聽的是要去開會，要準備可不忌同報告。 | 2.4s |
| 406 Whisper-MCE | | 我哋今晚要去嘅酒吧係咪好難搵呀？呢間餐廳嘅菜式真係唔錯，特別係佢嘅燒鵝，呢度高通都算方便，不過搭巴士要留意返工時間，呢個問題唔係咁簡單，要多加思考先得解決，我聽嘅要去開會，要準備可不記同報告。 | 2.5s |

FIG. 4

500

508 510

| | | | |
|---|---|---|---|
| 502 Whisper-Large | Original Text：我哋公司都幾 support 嘅，有好完善嘅 system 啦，會常常搞 marketing event 啦，係幫助同事嘅生意之餘，也會有 annual dinner 讓同事做嘢嘅環境更加開心。亦都會有啲 incentives 啦，比如去歐洲嘅 travel incentive 啦，或者有時候有演唱會嘅 fare。<br><br>Audio Length：15s | 我們公司也挺支持的有很完善的系統會上傳搞市場推廣活動在幫助同事的生意之餘也會有年度餐廳讓同事工作的環境更加開心也會有一些贊助例如去歐洲的旅行贊助或者有時候有演唱會的費用。 | 6.4s |
| 504 Whisper-Small | | 我們公司都挺支持的有很完善的系統會上上架，市場活動,在幫助同時的生意之餘都會有 NU Diner 同時工作的環境更開心也都會有些 incentive 例如去歐洲的 Travel Incentive 或者有時候有演唱會的費用。 | 2.5s |
| 506 Whisper-MCE | | 我哋公司都幾 support嚟，有好完善嘅 system 啦，會上傳搞 marketing event 啦，嚟幫助同事嘅生意以置於，都會有 annual dining 同事做嘢嘅環境比較開心，亦都會有啲 incentive star，譬如去歐洲嘅 travel incentive，或者有時候有演唱會嘅。 | 2.6s |

FIG. 5

ENHANCED SPEECH-TO-TEXT PERFORMANCE WITH MIXED LANGUAGES

CROSS-REFERENCE TO RELATED APPLICATION

This patent application claims priority to U.S. Provisional Patent Application No. 63/592,912, filed Oct. 24, 2023, and entitled, “A Speech to Text technique for better performance with mixed languages,” the entirety of which application is hereby incorporated by reference herein.

BACKGROUND

Speech-to-text applications can be used to recognize words in audio of speech of a person and convert the audio of the speech into textual words that can correspond to the words in the audio, and can present the textual words as an output. For example, a speech-to-text application can analyze audio of speech of a person speaking a particular language, and based on the analysis of such audio, can perform speech recognition to recognize words in the audio. The application can convert the recognized words into respective textual words that can be representative of the respective spoken words.

The above-described description is merely intended to provide a contextual overview regarding speech-to-text applications, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise generating, by a trained model of a system comprising at least one processor, mixed language data based on instruction data relating to mixed language data generation and seed topic data relating to a group of seed topics, wherein the mixed language data can comprise respective first textual words in a first language and respective second textual words in a second language that can be determined based on respective simulated conversations between respective simulated speakers, and wherein the respective second textual words can be interspersed with the respective first textual words. The method also can comprise: as part of training of a speech recognition model, determining, by the trained model of the system, quality metrics that can be indicative of a speech recognition performance of the speech recognition model in recognizing information relating to spoken mixed language words that can be representative of the mixed language data, and generating textual transcript mixed language words that can be representative of the spoken mixed language words, wherein the quality metrics can be indicative of a fidelity, an accuracy, and a latency relating to the speech recognition performance.

In certain embodiments, the disclosed subject matter can comprise a system that can comprise at least one memory that can store computer executable components, and at least one processor that can execute computer executable components stored in the at least one memory. The computer executable components can comprise a mixed language data generator that can determine and generate mixed language data based on instruction information relating to mixed language data generation and seed topic information relating to a group of seed topics, wherein the mixed language data can comprise respective first textual words in a first language and respective second textual words in a second language that can be determined based on respective simulated conversations between respective simulated speakers, and wherein the respective second textual words can be commingled with the respective first textual words. The computer executable components also can comprise an evaluator that can determine, in connection with training of a speech recognition model, quality metric values that can be indicative of a speech recognition performance of the speech recognition model in recognizing information relating to spoken mixed language words representative of the mixed language data, and generating textual transcript mixed language words that can be representative of the spoken mixed language words, wherein the quality metric values can relate to a fidelity, an accuracy, and a latency associated with the speech recognition performance of the speech recognition model.

In still other embodiments, the disclosed subject matter can comprise a non-transitory machine-readable medium, comprising executable instructions that, when executed by at least one processor, can facilitate performance of operations. The operations can comprise determining mixed language data based on instruction data relating to mixed language data generation and seed topic data relating to a group of seed topics, wherein the mixed language data can comprise respective first textual words in a first language and respective second textual words in a second language that can be determined based on respective emulated conversations between respective emulated speakers, and wherein the respective second textual words can be intermingled with the respective first textual words within a same sentence. The operations also can comprise: in connection with training of a speech recognition model, determining quality metric rating values that can be indicative of a speech recognition performance of the speech recognition model in recognizing information relating to spoken mixed language words that can be representative of the mixed language data, and generating textual transcript mixed language words that can be representative of the spoken mixed language words, wherein the quality metric rating values can be representative of a fidelity, an accuracy, and a latency associated with the speech recognition performance of the speech recognition model.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

BRIEF DESCRIPTION OF THE DRAWINGS

FIG. 4 presents a diagram of non-limiting example speech recognition results relating to speech recognition performed with regard to an audio recording comprising spoken Cantonese words by a non-limiting example trained speech recognition model (e.g., Whisper-mixed Cantonese and English (MCE) model) that is trained using the enhanced mixed language datasets and enhanced FAL evaluation techniques described herein and certain other trained speech recognition models trained using existing language datasets and existing training techniques.

FIG. 5 presents a diagram of non-limiting example speech recognition results relating to speech recognition performed with regard to an audio recording comprising spoken mixed Cantonese and English words by the non-limiting example trained speech recognition model (e.g., Whisper-MCE model) and the certain other trained speech recognition models, in accordance with various aspects and embodiments of the disclosed subject matter.

DETAILED DESCRIPTION

Figure 1:
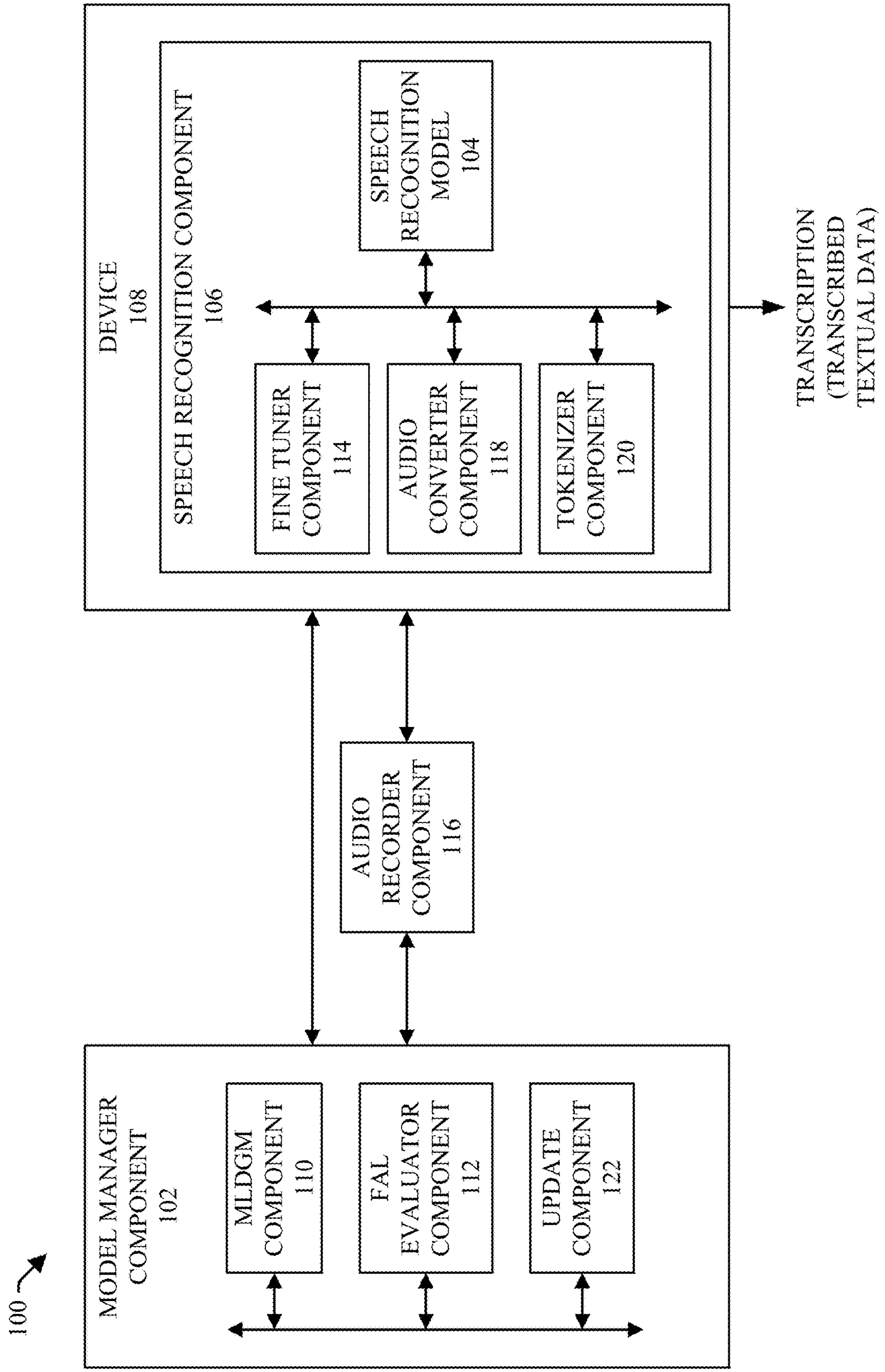
FIG. 1 illustrates a block diagram of a non-limiting example system that can desirably train a speech recognition model that can desirably recognize mixed language words in speech and convert those words to textual data, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

This disclosure relates generally to systems, mechanisms, methods, and techniques that desirably (e.g., suitably, accurately, quickly, efficiently, reliably, enhancedly, or optimally) can perform speech recognition (e.g., automatic speech recognition (ASR)) on audio of mixed-language speech of a person, convert the respective recognized spoken words (e.g., mixed language words) of the audio to respective textual words or characters that can correspond to, and be representative of, the spoken words, and present the textual words or characters as an output.

There are some existing speech-to-text systems for performing speech recognition on audio of speech by a person and converting the spoken words to textual words with varying degrees of success and accuracy. Certain of these existing speech-to-text systems can perform speech recognition on audio of mixed-language speech. Typically, existing systems can utilize (e.g., apply) a speech recognition audio dataset to a speech recognition model to train the speech recognition model to perform speech recognition on audio of a person speaking words.

However, existing speech-to-text systems can be deficient in a number of ways. One deficiency of some of these existing speech-to-text systems can be that they are not able to perform speech recognition on audio speech involving mixed languages, particularly challenging sets of mixed languages, such as Cantonese and English, with a sufficiently high level of accuracy, or may not be able to perform speech recognition on mixed language audio speech at all. A deficiency of certain of these existing speech-to-text systems can be that such existing systems can have undesirably high costs, including financial costs, computational costs, and/or time costs (e.g., undesirably high latency and slow speech recognition speed), in performing speech recognition on mixed languages, even if they are able to perform speech recognition of audio of speech with some level of accuracy. Still another deficiency of some existing speech-to-text systems can be that existing speech recognition audio datasets used to train speech recognition models can be deficient with regard to certain languages and mixed languages, including, for example, Cantonese or mixed Cantonese and English. Yet another deficiency of some existing speech-to-text systems can be that they employ a word error rate (WER) technique or character error rate (CER) that may not be desirable (e.g., may not be suitable, acceptable, accurate, or optimal) for evaluating the performance of speech recognition systems for certain languages or mixed languages, such as, for example, Cantonese or mixed Cantonese and English.

It can be desirable (e.g., suitable, beneficial, advantageous, useful, improved, or optimal) to have a speech-to-text system, method, and technique that can quickly, efficiently, and accurately perform speech recognition on audio of mixed language speech (e.g., Cantonese and English, or other languages) and convert the spoken words to corresponding textual words or characters. It also can be desirable to suitably or enhancedly train a speech recognition (e.g., speech-to-text) model to be able to accurately, efficiently, and quickly perform speech recognition on audio of mixed language speech. It further can be desirable to accurately and efficiently evaluate performance of speech recognition systems for various types of languages or mixed languages, including, for example, Cantonese or mixed Cantonese and English, to facilitate fine tuning and training the speech recognition model. The disclosed subject matter can address and overcome the aforementioned deficiencies and other deficiencies of the existing systems and techniques, as the systems, methods, and techniques disclosed herein desirably can enhance (e.g., improve, increase, or optimize) performance of speech recognition on audio of mixed language speech and convert the spoken words to corresponding textual words or characters such that a desirably high level of accuracy in the recognition and conversion of speech to text can be achieved, while also achieving such recognition and conversion of speech to text at a desirably fast speed, as compared to existing speech-to-text systems, methods, and techniques. To facilitate desirable speech recognition, the disclosed subject matter can employ systems, methods, and techniques for generating a desirable mixed language audio dataset (e.g., a mixed Cantonese and English audio dataset) that can be used to train a speech recognition model (e.g., an enhanced speech recognition model) to be able to desirably perform speech recognition of audio of mixed language of spoken words of a person. Further, in connection with the performance of such speech recognition, the disclosed subject matter can employ systems, methods, and techniques that can desirably employ an enhanced performance evaluation technique that can desirably (e.g., accurately, efficiently, enhancedly, or optimally) evaluate performance of speech recognition systems for various types of languages or mixed languages, including, for example, Cantonese or mixed Cantonese and English, to facilitate fine tuning and training the speech recognition model.

To that end, techniques that can desirably (e.g., automatically, dynamically, suitably, reliably, efficiently, enhancedly, and/or optimally) generate enhanced mixed language datasets and generate enhanced trained mixed language speech recognition models based at least in part on the enhanced mixed language datasets, are presented. A system can comprise a model manager component that can control generation of enhanced mixed language datasets, and training and/or operation of the mixed language speech recognition model based at least in part on the enhanced mixed language datasets. In some embodiments, the model manager component can comprise or employ one or more AI-based models, such as, for example a generative pre-trained transformer (GPT) model(s) (e.g., a fourth generation GPT (GPT-4) model(s), another type of transformer-based model, another type of multimodal large language model, and/or another type of AI-based model. The model manager component can comprise a mixed language data generation manager (MLDGM) component that can be part of or can be associated with the trained model (e.g., trained AI-based model). The MLDGM component (e.g., of or employing the trained model) can generate the enhanced mixed language datasets comprising respective words in mixed languages (e.g., at least two different languages) based at least in part on instructions relating to mixed language data generation and/or seed topics (e.g., seed topics that can facilitate conversations relating to the seed topics or other topics), wherein the respective words of the dataset can comprise, for example, respective first words in a first language (e.g., Cantonese or other desired first language) and respective second words in a second language (e.g., English or other desired second language that can be different from the first language), and wherein the respective second words can be interspersed with the respective first words, in accordance with defined model management criteria, such as described herein. In certain embodiments, the MLDGM component can generate and present as output a transcript (e.g., textual transcript data) that can be representative of the mixed language dataset. It is to be appreciated and understood that, while the terms words and/or subwords often may be used herein, depending on the language being referenced with regard to a mixed language dataset or a transcript (e.g., a textual transcript generated by the speech recognition model), words or subwords may refer to characters of a language (e.g., Chinese or other language characters, or even individual characters of a language (e.g., an individual character of the English language), and/or may refer to alphanumeric characters of such language.

In some embodiments, an audio recorder component can record human speakers speaking the respective words in the mixed languages to generate audio content comprising respective spoken words (e.g., respective verbally spoken words) in the mixed languages. Alternatively, in other embodiments, the MLDGM component can employ a speech generator component that can generate, and present as an output, audio content of simulated (e.g., simulated, emulated, or synthesized) speakers speaking (e.g., as synthesized speech) the respective words (e.g., spoken mixed language words) corresponding to and/or representative of the mixed language words of the mixed language dataset to generate the respective spoken words in the mixed languages contained in such audio content.

In some embodiments, that system can comprise a fine tuner component that can facilitate configuring (e.g., setting) hyperparameters and/or parameters (e.g., weights or other parameters) of the mixed language speech recognition model. The system also can comprise an audio converter component that can generate audio-based information representative of the audio content (e.g., a visual, graphical, or spectral representation of the audio content) comprising the respective spoken words in the mixed languages (e.g., respective spoken words of the human speakers or the simulated speakers) representative of the mixed language dataset. In certain embodiments, the audio-based information can be or can comprise a spectrogram (e.g., a log-mel spectrogram) that can be representative of the respective spoken words spoken by the speakers (e.g., the human speakers or the simulated speakers) in the audio content. The system further can comprise a tokenizer component that can tokenize the respective words or subwords of the respective words of the textual transcript data of the mixed language dataset to generate a group of tokens, based at least in part on the results of analyzing the textual transcript data, wherein respective tokens of the group of tokens can be representative of the respective words or subwords contained in the textual transcript data.

As part of an iteration of training of the speech recognition model, the fine tuner component can input (e.g., apply) the audio-based information (e.g., the spectrogram information) into the speech recognition model, and the tokenizer component can input the group of tokens (e.g., can sequentially input the respective tokens) into the speech recognition model. The speech recognition model can analyze (e.g., perform an AI-based analysis on) the audio-based information and the group of tokens. In some embodiments, the speech recognition model can comprise a transformer-based encoder-decoder architecture, comprising an encoder component (e.g., comprising a group of encoder blocks that can be comprised of multiple neural network layers) and a decoder component (e.g., comprising a group of decoder blocks that can be comprised of multiple neural network layers) associated with the encoder component, such as described herein. As part of the analysis, the speech recognition model can perform next token prediction to facilitate predicting, recognizing, and/or determining words contained in the audio-based information. Based at least in part on the results of such analysis by the speech recognition model, the speech recognition model can recognize or determine the words (e.g., spoken words) in the audio-based information and convert the recognized words to textual words that can be representative of the spoken words contained in the audio-based information, and the speech recognition model also can be trained. The speech recognition model can generate, and present as an output, a transcript, comprising the respective textual words (e.g., textual transcript mixed language words) that can be representative of the spoken mixed language words contained in the audio-based information.

In some embodiments, the model manager component (e.g., the trained AI-based model of or associated with the model manager component) can comprise or employ a fidelity-accuracy-latency (FAL) evaluator component that can determine quality metrics, comprising a fidelity metric, an accuracy metric, and a latency metric, associated with performance of speech recognition on the audio-based information by the speech recognition model (e.g., during each iteration of training of the speech recognition model), in accordance with the defined model management criteria. The fidelity metric can be indicative of the fidelity of the textual transcript mixed language words to the audio content comprising the spoken mixed language words. The accuracy metric value can be indicative of the accuracy of the textual transcript mixed language words relative to the spoken mixed language words. The latency metric value can be indicative of the latency (e.g., the amount of time) associated with the recognizing of the spoken mixed language words and the generating of the textual transcript mixed language words by the speech recognition model.

Based at least in part on the results of such determination of the quality metrics, the FAL evaluator component (or another component of the model manager component) can determine an update to the mixed language data generation process (e.g., modifications to the parameters and/or operations of or associated with the mixed language data generation process), and/or hyperparameters or parameters (e.g., modifications of the hyperparameters or parameters) of the speech recognition model that can enhance further training and performance of the speech recognition model, including enhancing the fidelity, accuracy, and/or latency relating to performance of speech recognition (e.g., ASR) by the speech recognition model. The model manager component can manage (e.g., control) one or more iterations of training of the speech recognition model, including one or more respective updates to the mixed language data generation process and/or the hyperparameters or parameters of the speech recognition model, in accordance with the defined model management criteria, such as described herein.

The disclosed subject matter, by employing the model manager component, and the MLDGM component and FAL evaluator component associated therewith, and the enhanced techniques (e.g., mixed language dataset generation and FAL evaluation techniques) described herein, can desirably (e.g., automatically, dynamically, suitably, reliably, efficiently, enhancedly, and/or optimally) can generate mixed language datasets that can be enhanced as compared to mixed language datasets that can be generated using existing techniques; and the enhanced mixed language datasets can be utilized to train speech recognition models to created enhanced trained speech recognition models that can provide improved speech recognition, particularly with regard to mixed language speech, as compared to existing trained speech recognition models. The disclosed subject matter, by employing the FAL evaluator and the enhanced FAL evaluation techniques described herein, also can desirably enhance determination of the performance and issues (e.g., errors) of speech recognition by the speech recognition model (e.g., the mixed language speech recognition model being trained) as compared to existing techniques for determining performance and errors associated with training speech recognition models; and can enhance modifications relating to the training of the speech recognition model such that the training (e.g., iterative training) of the speech recognition model can be improved and/or refined, and the resulting trained speech recognition model can be enhanced, as compared to existing techniques for training a speech recognition model and the performance of the trained speech recognition model that is trained using the existing techniques.

These and other aspects and embodiments of the disclosed subject matter will now be described with respect to the drawings.

Referring now to the drawings, FIG. 1 illustrates a block diagram of a non-limiting example system 100 that can desirably (e.g., automatically, dynamically, suitably, efficiently, reliably, enhancedly, and/or optimally) train a speech recognition model (e.g., an AI-based speech-to-text model) that can desirably (e.g., accurately, efficiently, reliably, enhancedly, and/or optimally) recognize mixed language words in speech and convert those words to textual data, in accordance with various aspects and embodiments of the disclosed subject matter. The system 100 can comprise a model manager component 102 that can manage desirable training of a speech recognition model 104 (e.g., AI-based speech-to-text model) of a speech recognition component 106 using a desirable (e.g., enhanced, reliable, and/or optimal) mixed language dataset comprised of multiple languages and an enhanced FAL rating technique (and mechanism), such as described herein.

In accordance with various embodiments, the speech recognition component 106, comprising the speech recognition model 104, can be part of or associated with (e.g., communicatively connected to) a device 108. For example, the device 108 can be a computer that can comprise the speech recognition component 106. As another example, a first device (e.g., a computer, a server, or other type of device) can comprise the speech recognition component 106, and a second device (e.g., a mobile phone, a virtual assistant (VA) device, or other type of device) can access or communicate with (e.g., via a wireless or wireline communication network) the first device to access, communicate with, and/or utilize the speech recognition component 106. A device (e.g., 108) can be, for example, a computer, a laptop computer, a server, a wireless, mobile, or smart phone, an electronic pad or tablet, a VA device, electronic eyewear, an electronic watch, or other electronic bodywear, an electronic gaming device, an Internet of Things (IoT) device (e.g., a health monitoring device, a toaster, a coffee maker, blinds, a music player, speakers, a telemetry device, a smart meter, a machine-to-machine (M2M) device, or other type of IoT device), a device of a connected vehicle (e.g., car, airplane, train, rocket, and/or other at least partially automated vehicle (e.g., drone)), a personal digital assistant (PDA), a dongle (e.g., a universal serial bus (USB) or other type of dongle), a communication device, or other type of device. In some embodiments, the non-limiting term UE can be used to describe the device.

In accordance with various embodiments, the model manager component 102 can comprise a mixed language data generation manager (MLDGM) component 110 and a FAL evaluator component 112. The MLDGM component 110 can determine and generate an enhanced mixed language dataset that can comprise at least two languages, wherein the mixed language dataset can be utilized to desirably train the speech recognition model 104. In some embodiments, the mixed language dataset can comprise respective first words in a first language (e.g., Cantonese or other desired first language) and respective second words in a second language (e.g., English or other desired second language that can be different from the first language), wherein the respective second words can be interspersed (e.g., interposed, intermingled, or commingled) with (e.g., between) the respective first words. For instance, some of the respective first words in the first language and some of the respective second words in the second language can be in a same sentence, with regard to one or more sentences of the mixed language dataset. In certain embodiments, the mixed language dataset can comprise or relate to one or more conversations between entities (e.g., simulated speakers) relating to one or more topics (e.g., news, sports, music, food, movies, television programs, politics, law, and/or other topics) that can relate to daily life of people, such as described herein. It is to be appreciated and understood that, while various aspects of the disclosed subject matter described herein can relate to Cantonese and English languages, the techniques, aspects, and embodiments described herein can be applied to, extended to, or utilized with virtually any desired languages (Spanish, French, German, Chinese, Japanese, Vietnamese, Korean, Italian, Russian, Turkish, Portuguese, Arabic, Persian, Hindi, or other desired language), and/or desired language dialects, along with, in addition to, or as an alternative to Cantonese and/or English. It also is to be appreciated and understood that, while the terms words and/or subwords often may be used herein, depending on the language being referenced with regard to a mixed language dataset or a transcript (e.g., a textual transcript generated by the speech recognition model 104), words or subwords may refer to characters of a language (e.g., Chinese or other language character(s) or symbol(s) that can be representative of a word(s) or subword(s) in another language, or even individual characters of a language (e.g., an individual character of the English language)), and/or may refer to alphanumeric characters of such language.

In accordance with various embodiments, the model manager component 102 can employ one or more AI-based models (e.g., one or more trained AI-based models) that can perform all or at least a portion of the respective functions of the MLDGM component 110 and the FAL evaluator component 112. In some embodiments, the model manager component 102 can comprise a trained AI-based model that can comprise or be associated with (e.g., communicatively connected to) the MLDGM component 110 and the FAL evaluator component 112. In other embodiments, the model manager component 102 can comprise a first trained AI-based model that can comprise or be associated with (e.g., communicatively connected to) the MLDGM component 110, and a second trained AI-based model that can comprise or be associated with the FAL evaluator component 112. In certain embodiments, the one or more AI-based models can be GPT-type models, such as, for example, GPT-4 models. In other embodiments, the one or more AI-based models can be another type of GPT model, another type of transformer-based model, another type of multimodal large language model, and/or another type of AI-based model.

With further regard to the speech recognition model 104, in accordance with various embodiments, the speech recognition model 104 can be a desired AI-based model (e.g., machine learning (ML), neural network, or other type of AI-based model) that can be usable or suitable to perform speech-to-text recognition (e.g., automatic speech-to-text recognition). In certain embodiments, the speech recognition model 104 can be a weakly supervised deep learning acoustic model that can employ an encoder-decoder transformer architecture, such as described herein. For example, the speech recognition model 104 can be a Whisper-type ML model, such as described herein. In other embodiments, the speech recognition model 104 can be another desired type of AI-based model that can be usable or suitable to perform speech-to-text recognition.

In certain embodiments, the system 100 can comprise a fine tuner component 114 (e.g., a configuration component) that can fine tune or configure, or facilitate fine tuning or configuring, the speech recognition model 104 based at least in part on a group of hyperparameters, parameters, and/or other information (e.g., parameters or other settings or configurations). For instance, the fine tuner component 114 can communicate the desired group of hyperparameters parameters, and/or the other information to the speech recognition model 104, wherein the speech recognition model 104 can be configured based at least in part on the group of hyperparameters and/or the other information. The particular hyperparameters of the group of hyperparameters can be based at least in part on certain factors, such as the type of AI-based model that the speech recognition model 104 is, an adjustment or refinement to one or more of the hyperparameters (e.g., to facilitate training or refining training of the speech recognition model 104), and/or another factor. For example, the speech recognition model 104 can be an enhanced (e.g., modified and improved) Whisper-type model, such as an enhanced Whisper-tiny model, an enhanced Whisper-base model, an enhanced Whisper-small model, an enhanced Whisper-medium model, or an enhanced Whisper-large model. A first group of hyperparameters can be utilized to configure (e.g., initially configure, or, in a subsequent iteration, refine configuration of) the enhanced Whisper-tiny model, a second group of hyperparameters can be utilized to configure the enhanced Whisper-base model, a third group of hyperparameters can be utilized to configure the enhanced Whisper-small model, a fourth group of hyperparameters can be utilized to configure the enhanced Whisper-medium model, and a fifth group of hyperparameters can be utilized to configure the enhanced Whisper-large model. In some embodiments, the speech recognition model 104 can be an enhanced Whisper-mixed language-small model (e.g., a fine-tuned Whisper-mixed language-small model), although, in other embodiments, the speech recognition model 104 can be a different type of enhanced Whisper-mixed language model.

In certain embodiments, the system 100 can comprise an audio recorder component 116 that can be utilized to record speakers (e.g., people speaking words) speaking the respective first words and respective second words of the mixed language dataset (e.g., speakers engaging in conversation using the respective first words and respective second words of textual transcript data of the mixed language dataset), and generate an audio recording (e.g., recorded audio content) comprising the respective words (e.g., the respective first words and respective second words) spoken by the speakers, such as described herein. In certain embodiments, the system 100 also can comprise an audio converter component 118 (e.g., a spectrogram generator component) that can generate a spectrogram that can be representative of the respective words spoken by the speakers in the audio recording. In some embodiments, the spectrogram can be a log-mel spectrogram, although, in other embodiments, the spectrogram can be a different type of spectrogram (e.g., a mel spectrogram or other type of spectrogram). In accordance with various embodiments, the audio converter component 118 can be part of the speech recognition component 106 (as depicted in FIG. 1), can be a separate component that can be associated with (e.g., communicatively connected to) the speech recognition component 106, or can be part of another component that can be associated with the speech recognition component 106.

In some embodiments, the system 100 can comprise a tokenizer component 120 that can tokenize the respective words or subwords (e.g., a syllable(s) or other portion of a word) of the respective words of the textual transcript data of the mixed language dataset to generate a group of tokens, based at least in part on the results of analyzing the textual transcript data, wherein respective tokens of the group of tokens can be representative of the respective words or subwords contained in the textual transcript data. For instance, based at least in part on the analysis results, the tokenizer component 120 can determine and generate a first token representative of a first word or subword in the first language, a second token representative of a second word or subword in the first language or the second language, a third token representative of a third word or subword in the first language or the second language, and so on with regard to the other words of the textual transcript data. In accordance with various embodiments, the tokenizer component 120 can be part of the speech recognition component 106 (as depicted in FIG. 1), can be a separate component that can be associated with (e.g., communicatively connected to) the speech recognition component 106, or can be part of another component that can be associated with the speech recognition component 106.

In some embodiments, the audio converter component 118 can input (e.g., apply) the spectrogram, and the tokenizer component 120 can input (e.g., apply) the group of tokens, to the speech recognition model 104 (e.g., as managed by the model manager component 102) to facilitate training the speech recognition model 104. The speech recognition model 104 can perform an AI-based analysis on the spectrogram information of the spectrogram and the group of tokens. Based at least in part on the results of the AI-based analysis of spectrogram information, the speech recognition model 104 can be trained (at least initially or partially trained), and can perform speech recognition on the spectrogram information to generate a transcript, comprising textual data, that can be representative of respective words (e.g., respective mixed language words) spoken in the audio content (e.g., the audio recording) and representative of the respective words that are represented in the spectrogram, such as described herein.

In certain embodiments, the speech recognition component 106 (e.g., the speech recognition model 104 or another component of the speech recognition component 106 can determine a loss function associated with performance of the speech recognition and generation of the transcript based at least in part on comparing the output data (e.g., predicted tokens representative of words, or the textual data of the transcript) output from the speech recognition model 104 to the input data (e.g., input tokens, or the textual transcript data of the mixed language dataset), wherein the loss function can indicate the amount of error or inaccuracy in the performance of the speech recognition and generation of the transcript, such as described herein. In accordance with various embodiments, the speech recognition component 106 can feed back (e.g., backpropagate) information relating to the loss function to the fine tuner component 114 and/or the model manager component 102 to facilitate determining and/or performing adjustments (e.g., modifications) to the hyperparameters for the speech recognition model 104, other parameters for the speech recognition model 104 or other function associated with training the speech recognition model 104, or the process of generating the mixed language dataset, such as described herein. For example, based at least in part on the loss function determination, the speech recognition component 106 (or the model manager component 102 or the fine tuner component 114) can determine an update (e.g., adjustment) that can be made to one or more hyperparameters for the speech recognition model 104 to fine tune and enhance (e.g., improve or increase) performance and accuracy of the speech recognition model 104 with regard to performing speech recognition on audio content of mixed language speech (or a spectrogram representative thereof) and converting the mixed language spoken words in the audio content to a transcript, comprising textual data, representative of or corresponding to the mixed language spoken words. The fine tuner component 114 can update one or more hyperparameters for the speech recognition model 104, based at least in part on the update, to facilitate refining training of the speech recognition model 104, reducing the loss function, and enhancing performance and accuracy of the speech recognition model 104.

In accordance with various embodiments, additionally or alternatively, the model manager component 102 can employ the FAL evaluator component 112 to evaluate the accuracy and efficiency of the speech recognition model 104 performing the speech recognition and converting speech to text. As disclosed, existing WER and CER techniques can be deficient, inefficient, and/or inaccurate in determining errors in words or characters and/or determining other issues associated with speech recognition performance, and can be deficient, inefficient, and/or inaccurate in determining training updates for speech recognition models, particularly with regard to speech recognition performed on mixed language speech. The FAL evaluator component 112 can employ an enhanced FAL rating technique (and corresponding mechanism) that can desirably determine enhanced FAL ratings that can more desirably (e.g., accurately, reliably, efficiently, enhancedly, or optimally) determine performance quality and/or error with regard to the speech recognition performance by the speech recognition model 104, particularly with regard to performing speech recognition on mixed language speech, as compared to existing WER or CER techniques. The FAL evaluator component 112 can determine and evaluate the fidelity, accuracy, and latency associated with the performance of speech recognition on mixed language speech of the audio content (e.g., the spectrogram representative of the audio content comprising the mixed language speech) by the speech recognition model 104 based at least in part on a set of validation data or a set of test data that can comprise or can be determined or derived (e.g., by the model manager component 102) based at least in part on the textual transcript data of the mixed language dataset, or a portion thereof, or information regarding or relating thereto. The fidelity factor can be or can relate to the fidelity of the transcription generated by the speech recognition model 104 to the original audio content. The FAL evaluator component 112 can determine and use the fidelity factor (e.g., a fidelity score, rating, or value (e.g., fidelity metric value) representative of the fidelity) to evaluate how well the speech recognition model 104, in the transcription comprising the transcribed textual data generated by the speech recognition model 104, captures the content and meaning of the speech (e.g., mixed language speech) in the original audio content, and can involve assessing the accuracy of the transcription (e.g., accuracy of the words and/or characters in the transcription, as compared to the words spoken in the audio content) and ensuring that the transcribed textual data in the transcription retains the intended message, tone, and context of the spoken words in the audio content.

With regard to the accuracy factor, the FAL evaluator component 112 can determine and/or measure the accuracy or correctness (e.g., an accuracy score, rating, or value (e.g., accuracy metric value) representative of the accuracy) of the transcription. The accuracy factor can involve the FAL evaluator component 112 determining and evaluating the ability of the speech recognition model 104 to correctly recognize and convert spoken words of the audio content into textual data (e.g., written text), including accurate representation of tones and pronunciation of respective words of the respective languages that were contained in the audio content (e.g., particularly with regard to more challenging languages, such as Chinese languages).

With regard to the latency factor, the FAL evaluator component 112 can determine, measure, or track the amount of time it takes for the speech recognition model 104 to process the audio content (e.g., the spectrogram representative of the audio content comprising the mixed language speech) and generate the transcription representative of the spoken words contained in the audio content, as evaluating the responsiveness and efficiency of the speech recognition model 104 in generating transcriptions in a timely manner can be desirable (e.g., useful, wanted, or beneficial). In some embodiments, the FAL evaluator component 112 can determine (e.g., calculate) a latency score, rating, or value (e.g., latency metric value) that can be representative of the amount of latency.

In accordance with various embodiments, the model manager component 102 can utilize the determinations of fidelity, accuracy, and/or latency (e.g., the fidelity, accuracy, and/or latency scores or ratings) as feedback that can be utilized to further train (e.g., refine or update the training of) the speech recognition model 104 in a subsequent (e.g., next) iteration of training of the speech recognition model 104. For instance, based at least in part on the determinations of fidelity, accuracy, and/or latency, the model manager component 102, employing an update component 122, can determine, perform, and/or facilitate performing an update (e.g., adjustment(s) or modification(s)) to the hyperparameters for the speech recognition model 104, other parameters associated with training the speech recognition model 104, the process of generating the mixed language dataset (e.g., adjustment to conversation prompts for conversation using the mixed languages or other adjustment to the process), the instructions for the process of generating the mixed language dataset, the topics utilized to facilitate generating the mixed language dataset, and/or other function or feature associated with training of the speech recognition model 104, such as described herein. If the update involves a modification relating to generation of the mixed language dataset for a subsequent (e.g., next) iteration of training of the speech recognition model 104, the model manager component 102 can control operation of the MLDGM component 110 and/or the information (e.g., instructions and/or seed topics) input to the MLDGM component 110, based at least in part on the update information of the update, such that a subsequent mixed language dataset generated by the MLDGM component 110 can be enhanced, as compared to the previous mixed language dataset to facilitate enhancing training of, and the further training of, the speech recognition model 104 during the subsequent training iteration.

In some embodiments, the update can involve the model manager component 102 or another component determining and selecting, or randomly determining and selecting, one or more topics to utilize as seed topics for the next iteration of generating of the mixed language dataset by the MLDGM component 110. In certain embodiments, with regard to the random determining and selecting of topics, the model manager component 102 or another component can perform such random determining and selecting of topics based at least in part on a random sampling function, a random number, a seed value, and/or another randomizing factor. For example, the model manager component 102 can comprise or can manage a random number generator (e.g., real or pseudo random number generator) that can generate a random number(s) based at least in part on the random sampling function, the seed value, and/or the other randomizing factor, wherein the random number can be utilized to randomly determine or select a topic from a group of topics (e.g., determine or select a topic that corresponds to the random number).

If the update involves a modification of a hyperparameter(s) associated with the speech recognition model 104, the model manager component 102 can communicate the update information to the fine tuner component 114. The fine tuner component 114 can perform or facilitate performing a modification of the hyperparameter(s) for the speech recognition model 104 (e.g., for reconfiguration of the speech recognition model 104), based at least in part on the update information, to enhance training of, or further train, the speech recognition model 104 during the subsequent training iteration. In some embodiments, if there was a first modification (e.g., a first modification to a hyperparameter(s)) determined based at least in part on the loss function, and a second modification (e.g., a second modification to the hyperparameter(s)) based at least in part on the determinations of fidelity, accuracy, and/or latency, the model manager component 102 or another component (e.g., the fine tuner component 114) can reconcile any difference between the first modification and the second modification, in accordance with the defined model management criteria. For example, the model manager component 102 or other component (e.g., the fine tuner component 114) can select the first modification over the second modification, or vice versa, to use as part of the update. Alternatively, the model manager component 102 or other component (e.g., the fine tuner component 114) can determine a third modification (e.g., a third modification to the hyperparameter(s)), based at least in part on the first modification and the second modification, and can utilize the third modification as part of the update.

The model manager component 102 can manage a desired number of iterations of determining and performing updates relating to hyperparameters, parameters, the process of generating the mixed language dataset, the instructions for the process of generating the mixed language dataset, the topics utilized to facilitate generating the mixed language dataset, and/or other function or feature associated with training of the speech recognition model 104, and a desired number of iterations of training of the speech recognition model 104 (e.g., based at least in part on the updates), until a desired performance level of the speech recognition model 104 is achieved (e.g., attained) or until a defined model training cessation (e.g., stopping) criteria is reached, in accordance with the define model management criteria, such as described herein. As desired, the model manager component 102 can continue to refine or update the training of the speech recognition model 104 over time as additional information (e.g., feedback information or other information) is received by the model manager component 102.

In accordance with various embodiments, the model manager component 102 can manage the generation and training of respective speech recognition models for respective languages (e.g., English, Spanish, German, Chinese, or other language) or respective mixed languages (e.g., Cantonese and English; German and English; Chinese and English; Chinese and Spanish; Cantonese and Italian; or other mixed languages), and/or respective language dialects. The techniques of the disclosed subject matter (e.g., employed by the model manager component 102, the speech recognition component 106, and/or other component described herein) can be desirably flexible and scalable to manage the generation and training of respective speech recognition models for respective languages or respective mixed languages, and/or respective language dialects to desirably satisfy (e.g., meet) diverse language recognition wants (e.g., needs) or specifications (e.g., requirements).

The trained speech recognition model 104 can be utilized for any of a variety of services, applications, or use cases. As some non-limiting examples, the trained speech recognition model 104 can be utilized for transcription services, language learning platforms, call center automation, multilingual voice assistants, multilingual speech recognition or translation applications or services for mobile devices or computers, multilingual Internet of Things (IoTs) devices or applications, and/or other desired services, applications, or use cases.

Figure 2:
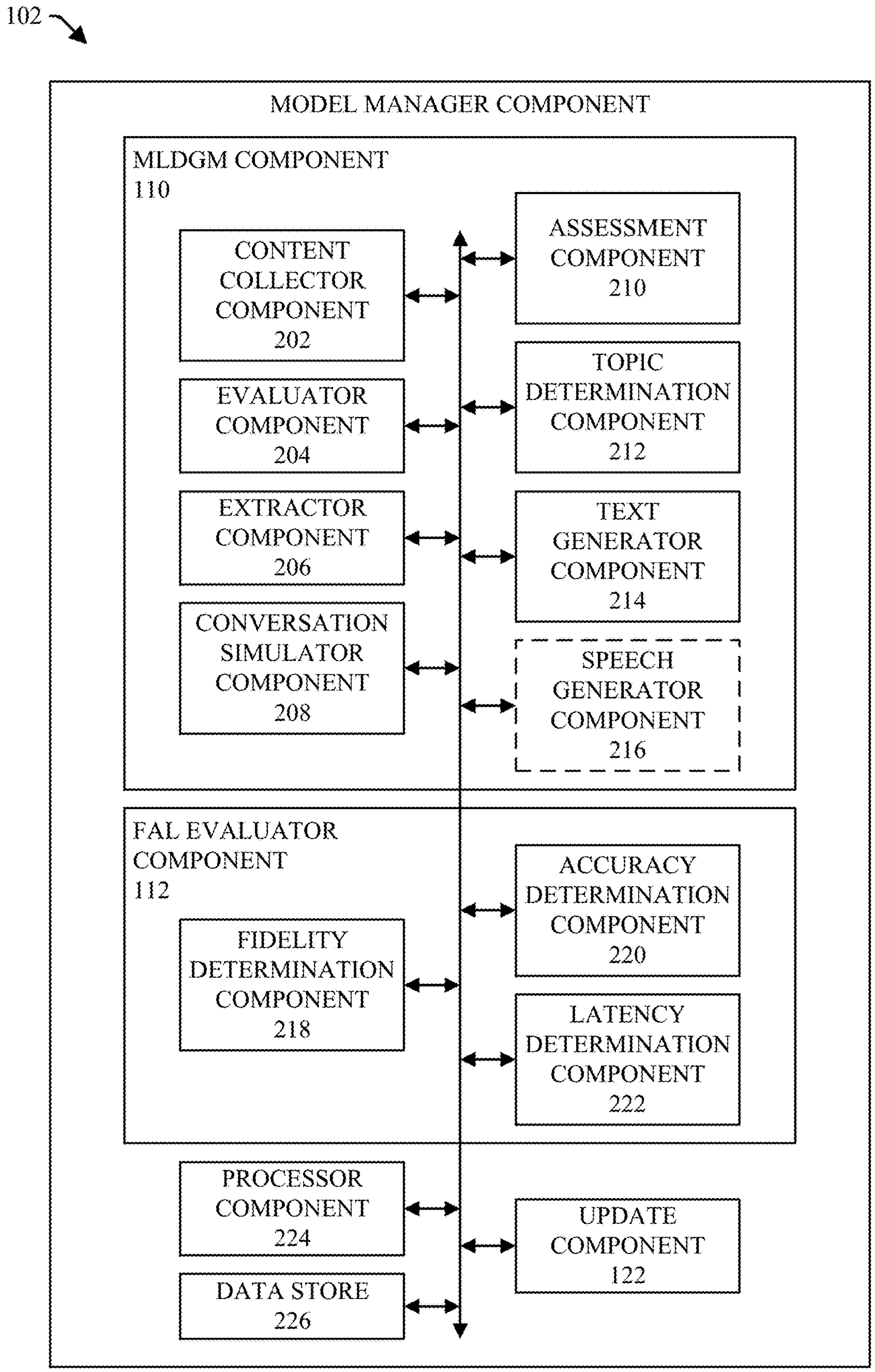
FIG. 2 depicts a block diagram of a non-limiting example model manager component 102 that can comprise a mixed language data generation manager (MLDGM) component that can desirably determine and generate a mixed language dataset usable to train the speech recognition model, and a fidelity-accuracy-latency (FAL) evaluator component that can perform FAL evaluations relating to performance of the speech recognition model as part of model training, in accordance with various aspects and embodiments of the disclosed subject matter.

Referring to FIG. 2 (along with FIG. 1), FIG. 2 depicts a block diagram of a non-limiting example model manager component 102 that can comprise the MLDGM component 110 that can desirably (e.g., automatically, dynamically, suitably, reliably, efficiently, enhancedly, and/or optimally) determine and generate a mixed language dataset usable to train the speech recognition model 104, and the FAL evaluator component 112 that can perform FAL evaluations relating to performance of the speech recognition model 104 as part of model training, in accordance with various aspects and embodiments of the disclosed subject matter. The model manager component 102 can comprise the MLDGM component 110, the FAL evaluator component 112, the update component 122, and/or one or more other components. In accordance with various embodiments, the MLDGM component 110 can comprise a content collector component 202 (e.g., an engineer agent), an evaluator component 204 (e.g., a critic agent), an extractor component 206 (e.g., a manager agent), a conversation simulator component 208 (e.g., a speaker agent), an assessment component 210 (e.g., a commentator agent), a topic determination component 212, and a text generator component 214. In certain embodiments, the MLDGM component 110 can comprise a speech generator component 216 and/or another component. The FAL evaluator component 112 can comprise a fidelity determination component 218, an accuracy determination component 220, a latency determination component 222, and/or another component. In accordance with various embodiments, the model manager component 102 can comprise (as depicted) or be associated with (e.g., communicatively connected to) a processor component 224 and a data store 226.

In some embodiments, the model manager component 102 can employ one or more AI-based (e.g., trained AI-based) models (e.g., GPT-type model, such as, for example, GPT-4 model, another type of transformer-based model, another type of multimodal large language model, and/or another type of AI-based model). For instance, the model manager component 102 can employ one AI-based model that can be, and/or can be used by, the MLDGM component 110 and the FAL evaluator component 112, or can employ one AI-based model that can be, and/or can be used by, the MLDGM component 110 and another AI-based model that can be, and/or can be used by, the FAL evaluator component 112. In certain embodiments, the one or more AI-based models (e.g., of or associated with the MLDGM component 110) can be a large language model that can generate data, such as mixed language data.

In some embodiments, the MLDGM component 110 (e.g., the AI-based model of or associated with the MLDGM component 110) can receive instructions relating to data collection and/or generation of a mixed language dataset, and/or seed topic information relating to seed topics that can be utilized to facilitate generating the mixed language dataset (e.g., generating mixed language data relating to the seed topics and/or other topics stemming from or based at least in part on the seed topics). The instructions can be created by one or more users (e.g., operators, technicians, or other user) and/or can be generated or customized by the model manager component 102 and/or can be determined based at least in part on feedback information that can be received from the FAL evaluator component 112, the speech recognition component 106, another component, and/or a user. Existing techniques that can employ a simple or fixed prompt may undesirably lead to or result in undesirable limitations in quantity, diversity, and/or creativity with regard to the language dataset. To avoid or mitigate such undesirable limitations, the model manager component 102 and/or a user can determine and/or set the seed topics (e.g., topic seed list) to abound the creativity of the mixed language data determined and generated by the MLDGM component 110. In certain embodiments, with regard to an iteration of generating a mixed language dataset and utilizing the mixed language dataset to facilitate training the speech recognition model 104, to facilitate desirable determination and generation of a mixed language dataset for the iteration, the topic determination component 212 can determine and generate (e.g., randomly determine and generate, or otherwise determine and generate) one or more seed topics that can be utilized to facilitate determining and generating the mixed language dataset, based at least in part on a previous mixed language dataset (e.g., from the last or other previous mixed language dataset of the last or other previous iteration of model training), to facilitate avoiding language data of a same or similar format.

The MLDGM component 110 can employ a multi-agent system and process designed to produce desirably high-quality mixed language datasets. The language dataset generation framework can break tasks into desirably less complex subtasks and can integrate multiple specialized agents (e.g., the engineer agent, critic agent, manager agent, speaker agent, commentator agent, and/or other agent) that can each contribute uniquely towards creation and refinement of the mixed language datasets. The architecture of the multi-agent system employed by the MLDGM component 110 can enable efficient handling of diverse language and data types, and can enhance the authenticity and applicability of the generated mixed language datasets for real-world applications (e.g., real-world applications of speech-to-text conversion, or other real-world applications).

In some embodiments, the content collector component 202 (e.g., the engineer agent) can comprise and/or utilize web crawlers and/or other tools to search for and/or collect (e.g., retrieve) respective items of content from the respective data sources (e.g., respective web or online sites, servers, and/or devices) based at least in part on the instructions (e.g., instructions for data collection) and/or the seed topics. The web crawlers and/or other tools can find and gather a vast array of content in the at least two languages that are going to be part of the mixed language dataset. The content collector component 202 can perform this content collection over a desired period of time. The respective items of content can comprise respective items of video content, respective items of audio content, and/or respective items of textual content (e.g., articles, news items, video content, audio content, multimedia content, and/or other type of content) that can be in respective languages, comprising at least two languages (e.g., Cantonese, English, and/or another language). This role of the content collector component 202 can ensure a continuous influx of raw data, comprising at least the two languages, that desirably can mirror or be representative of current language usage and trends with regard to at least the two languages.

The content collector component 202 or another component of the MLDGM component 110 or the model manager component 102 can label (e.g., identify, tag, or otherwise label) the respective items of content based at least in part on type of content (e.g., video, audio, textual, multimedia, or other type of content) of the content item (or portion thereof), language (e.g., Cantonese, English, Italian, Spanish, Indian, Japanese, German, or other language) of the content item (or portion thereof), part of speech (e.g., noun, pronoun, verb, adjective, adverb, preposition, conjunction, interjection, or other part of speech) of the content item (or portion thereof), dialect of the content item (or portion thereof), and/or other type of label.

The evaluator component 204 (e.g., the critic agent) can evaluate (e.g., perform an AI-based evaluation or analysis of) the performance and efficacy of the collection of the respective items of content by the web crawlers and/or other tools developed and/or utilized of the content collector component 202 to ensure desirable data diversity in the collected content items, check for and identify errors in the collected items of content, check and determine efficiency in the collection of the respective items of content, check for and determine adherence to specifications and/or guidelines relating to collection of content (e.g., ethical, instructed, or specified web scraping or data collection guidelines). The evaluator component 204 can determine and generate feedback information and/or a content collection update, based at least in part on the results of the evaluation of the performance and the efficacy of the collection of the respective items of content by the web crawlers and/or other tools of or associated with the content collector component 202. The evaluator component 204 can provide (e.g., communicate or transfer) the feedback information and/or a content collection update to the model manager component 102 (e.g., the content collector component 202 or other component of the MLDGM component 110 or the model manager component 102) and/or a user. The feedback information and/or the content collection update that can be utilized to improve collection of content (e.g., improved data diversity of content collected, reduce or mitigate errors in the content collected, improve efficiency in content collection, and/or mitigate or eliminate deviation from specifications or guidelines relating to collection of content) by the content collector component 202 and ensure that the content collection tools (e.g., web crawlers and/or other tools) can remain robust and effective over time. The evaluator component 204 or another component of the model manager component 102, and/or a user, can determine the content collection update based at least in part on the results of evaluating the content items that were collected, and the applicable specifications and/or guidelines relating to collection of content, wherein the results can indicate or relate to the data diversity of the content items collected, any errors identified in the content items collected, the efficiency in the collection of the content items, and/or the level of adherence to the specifications or guidelines relating to the collection of content items. The model manager component 102 (e.g., the evaluator component 204 or the other component of the model manager component 102) can update (e.g., modify or adjust) the content collector component 202 and/or the web crawlers or other data collection tools of or associated therewith based at least in part on update information of the update, in accordance with the define model management criteria.

In some embodiments, the extractor component 206 (e.g., the manager agent) can analyze the respective items of content, and, based at least in part on the analysis results, can identify and/or extract desired (e.g., relevant and/or wanted) topics, keywords, and/or other subject matter in and/or from the respective items of content, in accordance with the define model management criteria. For instance, the extractor component 206 can employ desired trained natural language processing models that can identify themes, topics, keywords, and/or other desired subject matter that can be prevalent (e.g., frequently or commonly occurring) in the respective items of content based at least in part on the results of the analysis (e.g., AI-based analysis) of the respective items of content. The topics can relate to daily life of people, and can relate to, for example, environment, social media, history, literature, hobbies, interests, music, art, movies, television shows, technology, news, pets, health and fitness, work, study, shopping, news (e.g., local news, national news, and/or international news), sports, entertainment, travel, food, weather, politics, law, and/or other topics. The extractor component 206 can determine and/or decide on desirable (e.g., the most desirable (e.g., most suitable, wanted, enhanced, or optimal)) models and techniques to be used for processing different types of data, ensuring that the mixed language dataset generation phase of the process can be desirably targeted and efficient.

The conversation simulator component 208 (e.g., the speaker agent) can simulate (e.g., synthesize or emulate) one or more respective conversations, relating to one or more respective topics, between respective speakers (e.g., simulated or emulated speakers) speaking in the mixed languages (e.g., at least two languages, such as Cantonese and English (and/or another desired language)) based at least in part on the topics, keywords, and/or other subject matter extracted from the respective items of content, in accordance with the define model management criteria. A simulated conversation between respective speakers can be a simulation or emulation of how speakers (e.g., local speakers speaking the mixed languages) can be expected to discuss (e.g., may or probably would discuss) the identified topic(s), with different prompts (e.g., conversation prompts) based at least in part on (e.g., using) the desired (e.g., relevant and/or wanted) topics, keywords, and/or other subject matter. With regard to each of the one or more respective conversations being simulated, the respective speakers of the simulated conversation can chat with each other (e.g., as operated or managed by the conversation simulator component 208), and the conversation simulator component 208 can generate textual data (e.g., a textual transcript) based at least in part on (e.g., corresponding to, representative of, or transcription of) the simulated conversation.

In certain embodiments, with the one or more respective conversations simulated and generated, and with the respective textual data corresponding to the one or more respective conversations generated, the assessment component 210 (e.g., the commentator agent) can assess (e.g., evaluate) the grammar, diction, coherence, and/or other quality of the textual data corresponding to the one or more respective simulated conversations between the respective speakers (e.g., simulated speakers) in the mixed languages. The assessment component 210 can evaluate the respective textual data to ensure that the respective textual data of the one or more respective simulated conversations satisfy (e.g., meet or exceed) desired (e.g., defined and/or high) linguistic standards and can be representative of natural language that typically can be used by people in mixed-language contexts where a person may speak respective words using multiple languages (e.g., within a same sentence) within the conversation. In some embodiments, the assessment component 210 can comprise, employ, or incorporate a mechanism that can respectively score, sort, and/or rank respective items of the textual data of the respective simulated conversations based at least in part on the quality metrics (e.g., grammar, diction, coherence, and/or other quality metric). The assessment component 210 can use or select the top-performing datasets (e.g., top-performing textual data items) of the respective textual data (e.g., the top-k textual data or otherwise determined top-performing textual data) to update (e.g., modify and/or enhance) prompts of the speakers (e.g., the simulated speakers of the speaker agent), thereby enabling a continuous loop (e.g., feedback loop) of improvement that can refine (e.g., enhance) the data output (e.g., mixed language textual data) in successive cycles (e.g., iterations) of simulating conversations in connection with iterations of generating mixed language datasets and using those mixed language datasets to iteratively train the speech recognition model 104. For instance, the assessment component 210 can determine and generate an update, comprising update information relating to the top-performing datasets. The assessment component 210 or another component of the MLDGM component 110 or the model manager component 102 can update the conversation simulator component 208 (e.g., the AI-based model of or associated with the speaker agent) to improve or refine prompts (e.g., conversation prompts) of the speakers (e.g., the simulated speakers of the speaker agent) and/or other functions of the conversation simulator component 208, based at least in part on the update information relating to the top-performing datasets input to the conversation simulator component 208, to improve or refine the data output (e.g., mixed language textual data) of the conversation simulator component 208 in subsequent cycles of simulation of conversations by the conversation simulator component 208, in accordance with the defined model management criteria.

In some embodiments, the MLDGM component 110 and/or the trained model can employ a desired algorithm (e.g., mixed language dataset generation algorithm) that can facilitate determining and/or generating all or at least a portion of a mixed language dataset (e.g., for each iteration of one or more iterations). For instance, the MLDGM component 110 and/or the trained model can utilize the following non-limiting example algorithm (e.g., Algorithm 1) and associated pseudocode to facilitate determining and/or generating all or at least a portion of a mixed language dataset, such as follows:

Algorithm 1 Generate Data

```
Input: None
Output: CSV files
Initialize csv_file_1.
for i = 1, 2, ... , 160 do
  df ← pd.read_csv(csv_file_i)
  topic_list ← df['topic'].unique( )
  for topic in topic_list do
    instance_list ← filter_data(df)
    instance_1, instance_2
    random.sample(instance_list['topic'], 2)
    prompt ← instruction + topic + instance1 + instance2
    df' ← GPT4_Generate(prompt)
    pd.to_csv(csv_file_{i+1}, df')
  end for
end for
```

For instance, in accordance with this example algorithm (e.g., Algorithm 1), the MLDGM component 110 and/or the trained model can start with a common-separated values (CSV) file for a desired number of CSV files (e.g., 160 CSV files, or another desired number of CSV files), and can loop (e.g., iterate) through the CSV files, wherein for a desired number of iterations (e.g., 160 iterations, or other desired number of iterations), the MLDGM component 110 and/or the trained model can perform the following operations (e.g., for each iteration): read a CSV file into a dataframe (df) (e.g., pd.read_csv); identify unique topics in the dataframe and generate a topic list (e.g., topic_list) comprising the unique topics; for each topic (e.g., in the topic list): filter the data (e.g., filter_data (df)) to obtain instances related to that topic and generate an instance list (e.g., instance_list) comprising the instances, randomly select or sample two instances (e.g., instance1, instance2) from this filtered data, create a prompt (e.g., conversation prompt) using an instruction, the topic, and/or the two instances, use the trained model (e.g., GPT-4 model or other trained model) to generate new data (e.g., df') based at least in part on this prompt, and save the generated data into a new CSV file; and repeat (e.g., during a next iteration) by continuing this process for each CSV file. In some embodiments, the MLDGM component 110 and/or the trained model can determine and/or generate all or a desired portion of the mixed language dataset based at least in part on application or execution of this example algorithm by the MLDGM component 110 and/or the trained model, such as described herein.

The list of topics can comprise a desirable number of distinct topics (e.g., current and/or relevant topics, such as described herein) that can ensure desirable data diversity for the mixed language dataset. With regard to each topic, the MLDGM component 110 and/or the trained model can provide, generate, or utilize a desired number of instances (e.g., more than 10 instances, or 10 instances or less, if desired) relating to respective conversations (e.g., mixed language conversations) relating to the topic that may take place between people. In some embodiments, in accordance with the algorithm, the MLDGM component 110 and/or the trained model can utilize two instances (or another desired number of instances) along with a desired topic of the topic list (e.g., for each topic of the topic list) as a prompt to determine and generate additional instances relating to respective conversations relating to the topic. In certain embodiments, the MLDGM component 110 and/or the trained model can perform resampling on the instances generated in the previous operation (e.g., using the two (or more) instances and the desired topic as a prompt) to determine and generate (e.g., to result in generation of) a refreshed group (e.g., set) of instances relating to the topic that can be used as prompts for further generation of instances relating to the topic (or another topic). This iterative process employed by the MLDGM component 110 and/or the trained model can allow the MLDGM component 110 and/or the trained model to continually expand the mixed language dataset while maintaining diversity and variety of words (e.g., mixed language words) and topics in the mixed language dataset.

With regard to the random sampling of instances disclosed in the example Algorithm 1, the random sampling of instances can be performed based at least in part on a random sampling function, a random number, a seed value, and/or another randomizing factor. For example, the model manager component 102 can comprise or can manage a random number generator (e.g., real or pseudo random number generator) that can generate a random number(s) based at least in part on the random sampling function, the seed value(s), and/or the other randomizing factor, wherein the random number(s) can be utilized to randomly sample or select an instance(s) from the filtered data (e.g., sample or select an instance that corresponds to the random number).

It is to be appreciated and understood that this non-limiting example algorithm (e.g., Algorithm 1) is merely one example algorithm that the MLDGM component 110 and/or the trained model can utilize to facilitate determining and/or generating all or at least a portion of a mixed language dataset, and, in accordance with other embodiments, the MLDGM component 110 and/or the trained model can utilize another desired algorithm to facilitate determining and/or generating all or at least a portion of a mixed language dataset, such as described herein, for example. It also is to be appreciated and understood that, while Algorithm 1 references GPT4 as the trained model, in other embodiments, the trained model can be a different type of model than a GPT4 model. It further is to be appreciated and understood that, while Algorithm 1 references using a CSV file, in other embodiments, a different type of file in a different (e.g., structured or non-structured) type of format (e.g., another structured format or an unstructured natural language format) can be used with the example Algorithm 1 or another desired algorithm that can be utilized by MLDGM component 110 and/or the trained model to facilitate determining and/or generating all or at least a portion of a mixed language dataset.

A mixed language dataset generated by the MLDGM component 110 and/or the trained model can comprise a relatively large number of sentences (e.g., thousands of sentences, even more than 15,000 sentences, as desired), including all or a desired portion of those sentences being mixed language sentences that can comprise a desirable mixture of words and characters in two (or more) languages, wherein the respective sentences can relate to and cover desired respective topics. In the mixed language dataset, there can be respective numbers of sentences relating to respective topics, wherein there can be certain topics that can be respectively associated with relatively higher numbers of sentences and certain other topics that can be respectively associated with relatively lower numbers of sentences, depending on the respective topics (e.g., respective types of topics), the current respective relevancies or topicalities of the respective topics, and/or other factors. Also, the number or frequency of second language words or characters being interspersed with first language words or characters, and the ratio of first language words or characters to second language words or characters, can vary based at least in part the type of topic, current language usage characteristics associated with the first language and second language, and/or other factors. As a non-limiting example, with regard to a non-limiting mixed language dataset, the topic of food (e.g., food category) can have a relatively higher frequency of second language words or characters (e.g., English words) interspersed with first language words or characters (e.g., Chinese characters), with a relatively lower first language word or character to second language word or character ratio (e.g., 3:1, or other relatively lower ratio). In contrast, in the non-limiting mixed language dataset, the topic of technology news may have a relatively lower frequency of second language words or characters (e.g., English words) interspersed with first language words or characters (e.g., Chinese characters), with a relatively higher first language word or character to second language word or character ratio (e.g., 8:1, or other relatively higher ratio). The respective frequencies and ratios associated with the respective topics may vary for respective mixed language datasets (e.g., over time, and/or as iterative training of the speech recognition model 104 and updates relating to generation of mixed language datasets are performed).

In some embodiments, the MLDGM component 110 can output (e.g., present or communicate as output) the mixed language dataset, comprising a transcript (e.g., textual transcript data) of the respective textual data corresponding to or representative of the one or more respective simulated conversations in the mixed languages wherein respective second words in the second language can be interspersed (e.g., interposed, intermingled, or commingled) with (e.g., between) respective first words in the first language. In certain embodiments, the MLDGM component 110 can respectively label (e.g., identify, tag, or otherwise label) the respective items of textual data (e.g., respective words, respective phrases, or other respective textual data items) of the transcript to facilitate training of the speech recognition model 104.

In some embodiments, the audio recorder component 116 (e.g., as managed by the model manager component 102 or another component of the system 100) can record speakers (e.g., people speaking words) speaking the respective first words and respective second words of the mixed language dataset (e.g., speakers engaging in conversation using the respective first words and respective second words of textual transcript data of the mixed language dataset), and generate an audio recording (e.g., recorded audio content) comprising the respective words (e.g., the respective first words and respective second words) spoken by the speakers, such as described herein. This audio recording of persons speaking the mixed language words of the mixed language dataset may be desirable over using simulated speakers to simulate or synthesize the speaking of the words of the mixed language dataset, as speech synthesis technology, or at least some speech synthesis technology, may not be desirably (e.g., suitably or acceptably) advanced enough to performing mixed language speech synthesis. The MLDGM component 110 can desirably curate the mixed language dataset such that the audio content representative of the mixed language dataset can comprise a desirably (e.g., suitably, enhancedly, or optimally) diverse range of audio samples representative of the target domain for the multiple, mixed languages.

In other embodiments, additionally or alternatively, the MLDGM component 110 can employ the speech generator component 216, which can generate, and present as an output, audio content of simulated speakers speaking (e.g., as synthesized speech) respective words corresponding to and/or representative of the mixed language words of the mixed language dataset. For instance, the speech generator component 216 can desirably (e.g., suitably, acceptably, and/or enhancedly) comprise the capability to synthesize or simulate the speaking of the words of the mixed language dataset where words of different languages are interspersed within the spoken conversation represented or presented in the mixed language dataset, and, accordingly, the speech generator component 216 can be usable, and can be utilized, to generate, and present as the output, the audio content of the simulated speakers speaking (e.g., as synthesized speech) the respective words (e.g., the mixed language words) of the mixed language dataset.

In some embodiments, the audio content (e.g., mixed language audio dataset) representative of the spoken mixed language words of the mixed language dataset can comprise respective portions of audio content that can comprise respective instances of conversations (e.g., respective instances portions of conversations) relating to respective topics (e.g., of the list of topics), wherein each instance can comprise one or more sentences comprising mixed language words in two (or more) languages (e.g., second language words interspersed with first language words within a same sentence). The respective portions of audio content, comprising the respective instances, can have respective lengths of time and can comprise respective numbers of words in the two (or more) languages. As a non-limiting example for a mixed language dataset, a relatively large number (e.g., most) of the respective portions of audio content can be in the range of 5 seconds to 12 seconds in length, and a relatively smaller number of the respective portions of audio content can be less than 5 seconds or more than 12 seconds in length (e.g., up to or even more than 25 seconds in length), although for other mixed language datasets, the respective lengths of the respective audio content portions and the time length distribution of the respective audio content portions can be different than this non-limiting example.

In certain embodiments, the model manager component 102 (e.g., the MLDGM component 110, trained model, or other component of the model manager component 102), the audio recorder component 116 (e.g., as controlled by the model manager component 102), or the speech generator component 216 (e.g., as controlled by the model manager component 102) can sample or allocate (e.g., randomly sample or allocate) the audio content (e.g., respective portions of the audio content, such as respective audio files and/or respective conversations or segments of spoken words) to divide the respective portions of the audio content, representative of the mixed language dataset, into a group (e.g., a set) of training audio content portions and a group of validation or testing audio content portions in a desired ratio (e.g., 9:1 ratio, or other desired ratio higher or lower than 9:1, of training audio content portions to validation or testing audio content portions). The random sampling or allocation of audio content portions can be performed based at least in part on a random sampling or allocation function, a random number, a seed value, and/or another randomizing factor. For example, the model manager component 102 can comprise or can manage a random number generator (e.g., real or pseudo random number generator) that can generate a random number based at least in part on the random sampling or allocation function, the seed value, and/or the other randomizing factor, wherein the random number can be utilized to determine, identify, or select an audio content portion that can be allocated to the group of validation or testing audio content portions (or alternatively, to the group of training audio content portions).

The audio content representative of the spoken mixed language words of the mixed language dataset can be pre-processed (e.g., as managed by the model manager component 102 or the speech recognition component 106) to generate features representative of the audio content that can be desirable (e.g., suitable, acceptable, or optimal) for training of the speech recognition model 104. In certain embodiments, the audio converter component 118 can generate a spectrogram that can comprise visual information (e.g., visual or graphic features) that can be representative of the respective words spoken by the speakers in the audio content (e.g., the audio recording created using the human speakers speaking the mixed language speech, or the audio content generated using simulated speakers synthesizing speaking of the mixed language speech). In some embodiments, the spectrogram can be a log-mel spectrogram that can capture the frequency content of the audio content over time and can provide a desirably compact representation of the respective words spoken by the speakers in the audio content. The log-mel spectrogram can employ the mel scale in the representation of the frequencies in the frequency content. In other embodiments, the spectrogram can be a different type of spectrogram (e.g., a mel spectrogram or other type of spectrogram) that can capture the frequency content of the audio content over time and provide a desirable representation of the respective words spoken by the speakers in the audio content.

The tokenizer component 120 can generate the group of tokens comprising respective tokens that can be representative of the respective words or subwords (e.g., a syllable(s), fragment, or other portion of a word) of the respective words (e.g., mixed language words) of the textual transcript data (e.g., labeled textual transcript data) of the mixed language dataset, based at least in part on the results of analyzing the textual transcript data, in accordance with a desired token generation and/or model training format, such as described herein. In some embodiments, with regard to multitask training of the speech recognition model 104, the tokenizer component 120 can generate and format the respective tokens representative of the respective words or subwords in a desired (e.g., specific or particular) multitask model training format that can enable the speech recognition model 104 to be trained on multiple related tasks, such as speech recognition, language modeling, and/or another desired task, concurrently, simultaneously, or in parallel. In certain embodiments, the tokens can comprise or can relate to SOT (e.g., start-of-transcript, start-of-turn, or start-of trajectory), language (LANG), task, timestamp (TS), text, or EOT (e.g., end-of-transcript, end-of-turn, or end-of trajectory). SOT can be a start boundary token that can relate to the start of the text, language can relate to the language (e.g., Cantonese, English, or other language) represented in the token, task can relate to a type of task (e.g., transcribe, speech recognition, or other type of task), timestamp can relate to the time (e.g., month, day, year, time-of-day, hour, minute, second, or other time indication) associated with the token and/or the temporal location of the token and represented word or subword in relation to other words or subwords, text can relate to, for example, a type of output (e.g., textual data as output), and EOT can be an end boundary token that can relate to the end of the text. In some embodiments, the tokenizer component 120 can generate the respective tokens of the group of tokens for the respective words or subwords concurrently, simultaneously, or in parallel with the audio converter component 118 generating the spectrogram.

During each iteration of generation of a mixed language dataset, the model manager component 102 (e.g., the MLDGM component 110 and/or another component of the model manager component 102) can pair (e.g., associate, link, map, or otherwise pair) the audio content representative of the mixed language dataset with the transcript (and/or the group of tokens) representative of the mixed language dataset to facilitate the training of the speech recognition model 104.

In connection with training and operation of the speech recognition model 104, during the fine tuning process, the fine tuner component 114 can initialize, fine tune, or configure, or facilitate fine tuning or configuring, the speech recognition model 104 based at least in part on a group of hyperparameters, parameters, (e.g., model weights or biases, or other parameters) and/or other information (e.g., parameters or other settings or configurations). For instance, the fine tuner component 114 can communicate the desired group of hyperparameters, parameters, and/or the other information to the speech recognition model 104, wherein the speech recognition model 104 can be configured (e.g., the hyperparameters or other parameters can be configured or set) based at least in part on the group of hyperparameters parameters, and/or the other information. The particular hyperparameters of the group of hyperparameters can be based at least in part on certain factors, such as the type of AI-based model that the speech recognition model 104 is, an adjustment or refinement to one or more of the hyperparameters (e.g., to facilitate training or refining training of the speech recognition model 104), and/or another factor. The hyperparameters can comprise or relate to, for example, a number of epochs, a batch size, a number of layers (e.g., neural network layers), a number of nodes in each layer, and/or another desired hyperparameter associated with the speech recognition model 104. In some embodiments, on the initial iteration of training, and/or a subsequent iteration of training, of the speech recognition model 104, the hyperparameters and/or parameters, or at least some of the hyperparameters and/or parameters, can be determined or learned from a pretraining task (e.g., a relatively large-scale pretraining task), such as unsupervised training on a desirable (e.g., a relatively large or massive) amount of audio data. The desired group of hyperparameters and/or parameters utilized by the speech recognition model 104, and/or the operations or processes performed by the speech recognition model 104, can be updated (e.g., adjusted, modified, or reconfigured) based at least in part on the results of the FAL evaluation, WER, CER, and/or other evaluation of the quality of the speech recognition performed by the speech recognition model 104, in accordance with the defined model management criteria, such as described herein.

The audio converter component 118 (or another component) can input or apply the spectrogram information of the spectrogram to the speech recognition model 104 and/or the tokenizer component 120 can input or apply the group of tokens associated with the spectrogram to the speech recognition model 104 (e.g., as managed by the model manager or speech recognition component 106). The speech recognition model 104 (e.g., the mixed language speech recognition model) can analyze (e.g., perform an AI-based analysis on) the spectrogram information of the spectrogram and/or the respective tokens of the group of tokens. In some embodiments, the speech recognition model 104 can analyze the spectrogram information and the respective tokens simultaneously, concurrently, or in parallel.

Based at least in part on the results of analyzing the spectrogram information and/or the respective tokens, the speech recognition model 104 can be trained to perform speech recognition, can learn to perform speech recognition, and can perform speech recognition on information (e.g., spectrogram information, tokens, and/or other information) relating to or representative of the audio content comprising the spoken words of the mixed language dataset. In connection with the training of the speech recognition model 104 and the performing of speech recognition by the speech recognition model 104, the speech recognition model 104 can perform next token prediction, can generate the predicted tokens as an output, and/or can determine and generate, as an output, the transcription, comprising the transcribed textual data (e.g., transcribed textual data representative of the mixed language words represented in the information input to the speech recognition model 104), such as described herein.

Figure 3:
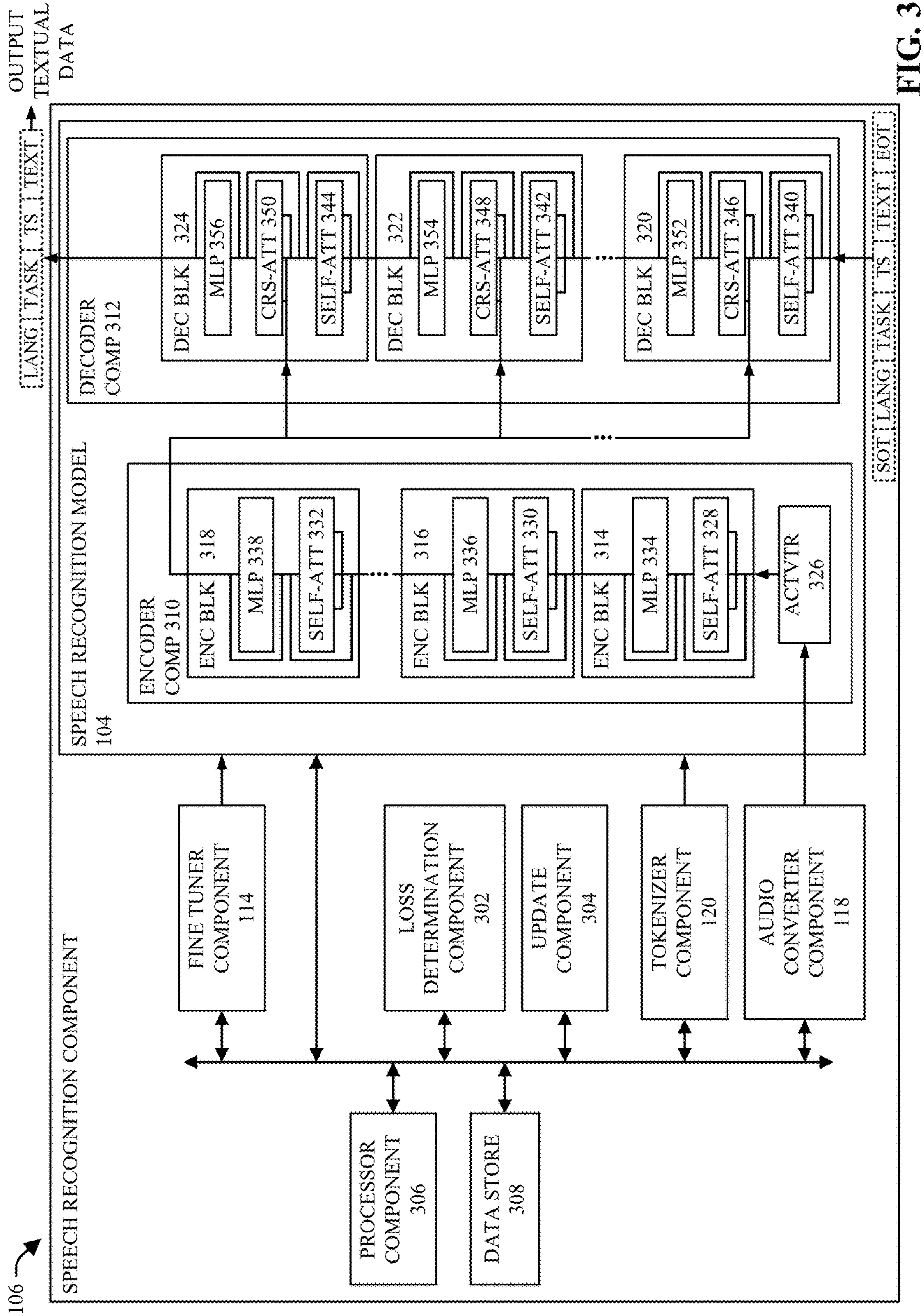
FIG. 3 illustrates a block diagram of a speech recognition component comprising the speech recognition model, in accordance with various aspects and embodiments of the disclosed subject matter.

Referring to FIG. 3 (along with FIGS. 1 and 2), FIG. 3 illustrates a block diagram of the speech recognition component 106 comprising the speech recognition model 104, in accordance with various aspects and embodiments of the disclosed subject matter. In accordance with various embodiments, the speech recognition component 106 can comprise the speech recognition model 104, the fine tuner component 114, the audio converter component 118, the tokenizer component 120, a loss determination component 302, an update component 304, a processor component 306, and/or a data store 308.

In some embodiments, the speech recognition model 104 can employ a transformer-based encoder-decoder architecture that can be composed of an encoder component (ENCODER COMP) 310 and a decoder component (DECODER COMP) 312. As disclosed, in some embodiments, the data input to the encoder component 310 can be labeled speech-related data (e.g., the textual transcript data, such as labeled textual transcript data, and/or spectrogram information) that can be representative of the mixed language dataset for analysis and processing by the speech recognition model 104 to facilitate training the speech recognition model 104 and/or performing of speech recognition on the input data to generate a transcription comprising the transcribed textual data (e.g., comprising textual words in mixed languages) that can be representative of and/or can correspond to the spoken mixed language words of the audio content that can be representative of the words in the mixed language dataset (e.g., the enhanced mixed language dataset). The speech recognition model 104, employing the encoder component 310 and decoder component 312, can perform next-token prediction to predict a next token in a sequence of tokens based at least in part on the results of analyzing and processing (e.g., encoding and decoding) of the input data, wherein the next token can be representative of a next word or subword in a sequence of words (e.g., a sentence (or other collection of words) of the spoken mixed language words of the audio content) that can be represented by the sequence of tokens, such a described herein.

The encoder component 310 can comprise one or more encoder blocks (e.g., transformer encoder sub-components), such as encoder blocks (ENC BLKs) 314, 316, and/or 318, that can be associated with (e.g., communicatively connected to) each other (e.g., the output of encoder block 314 can be associated with the input of encoder block 316, and the output of encoder block 316 can be associated with the input of the next encoder block). The encoder blocks (e.g.,

314, 316, and/or 318) can process or analyze the audio features represented in the spectrogram information, and based at least in part on the results of such processing or analyzing, can extract high-level representations of the audio features (e.g., can generate a sequence of context-aware representations of the spectrogram information and associated audio features). The encoder blocks (e.g., 314, 316, and/or 318) can comprise multiple layers that each can comprise self-attention and feed-forward neural network layers, such as described herein.

The decoder component 312 can comprise one or more decoder blocks (e.g., transformer decoder sub-components), such as decoder blocks (DEC BLKs) 320, 322, and/or 324, that can be associated with (e.g., communicatively connected to) each other (e.g., the output of decoder block 320 can be associated with the input of decoder block 322, and the output of decoder block 322 can be associated with the input of the next decoder block). The output of the encoder component 310 can be associated with the respective inputs (e.g., respective input ports) of the respective decoder blocks (e.g., 320, 322, and/or 324) of the decoder component 312. The decoder blocks (e.g., 320, 322, and/or 324) can generate output transcriptions (e.g., textual transcriptions) representative of the mixed language words of the mixed language dataset based at least in part on the results of processing or analyzing the encoded audio representations of the audio features. The decoder blocks (e.g., 320, 322, and/or 324) can comprise multiple layers that each can comprise self-attention and feed-forward neural network layers, such as described herein.

The speech recognition model 104 also can comprise an activator component (ACTVTR) 326 that can be associated with the input of the encoder component 310, and can be used to facilitate activation of the speech recognition model 104. In some embodiments, the activator component 326 can comprise a 2 x one-dimensional (1D) convolution layer (Conv1D), Gaussian-error-linear-unit (GELU) activator function that can apply a convolution operation over one-dimensional sequence data (e.g., the spectrogram information, the tokens or textual transcript data, or other data) as part of analysis of such data. The Conv1D layer can create a convolution kernel that can be convolved with the layer input (e.g., sequence data) over a single spatial or temporal dimension to produce a tensor of outputs. The GELU activation of the activator function can comprise performance of a desired GELU activation operation that can weight (e.g., can apply respective weight values to) the data (e.g., sequence data) input to the activator component 326 by its probability under a Gaussian distribution. The activator component 326 (e.g., employing the Conv1D) typically can be utilized for analyzing temporal signals or textual data. In other embodiments, the activator component 326 can comprise different features than the ConvID layer and/or the GELU, such as, for example, a rectified linear unit (ReLU), exponential linear unit (ELU), or parametric ReLU (PRELU) (e.g., in place of GELU). The output data output from the activator component 326 (e.g., generated based at least in part on the analysis of the input data input to the activator component 326) can be input to the encoder component 310 (e.g., input to encoder block 314). The output data input to the encoder component 310 can facilitate (e.g., enable) sinusoidal positional encoding of the data by the encoder component 310. The sinusoidal positional encoding of the data can be utilized to incorporate the temporal information of the audio features of the audio content (e.g., the spectrogram information representative of the audio content) into the speech recognition model 104, which can assist the speech recognition model 104 to understand the sequence of the input data (e.g., the spectrogram information representative of the audio content).

In some embodiments, the respective encoder blocks (e.g., 314, 316, and/or 318) of the encoder component 310 each can comprise respective self-attention components (SELF-ATT) (e.g., 328, 330, and/or 332) and respective multi-layer perceptron (MLP) components (e.g., 334, 336, and/or 338) that can be associated with (e.g., communicatively connected to) the respective self-attention components (e.g., 328, 330, and/or 332). The respective self-attention components (e.g., 328, 330, and/or 332) can be or can comprise a desired number of respective self-attention layers that can enable the self-attention components (and the speech recognition model) to determine (e.g., dynamically or automatically determine) the relative importance of respective items of data (e.g., words or subwords) in a sequence of data items, enabling the self-attention components (and thus, the model) to capture long-range dependencies in data (e.g., words). For instance, a self-attention component (e.g., 328, 330, or 332) can analyze a sentence of words (e.g., mixed language words) to determine and/or obtain the context of the sentence, which can facilitate processing (e.g., natural language processing) of the sequence of words (e.g., spectrogram information representative of the sentence, or sequence of tokens representative of the sequence of words) in the sentence and recognizing those words. As part of the self-attention process, a self-attention component (e.g., 328, 330, or 332) can, for example, assign a query to each word in the sentence, compare the queries associated with the sentence to keys, which can be determined or derived from the words in the sentence, in order to determine or identify the most relevant information with regard to that sentence. The self-attention component can combine the respective items of information from (and as part of) such self-attention process, with the respective items of information being respectively weighted based on their respective relevance, to determine and generate a contextual representation of each of the words in that sentence. In some embodiments, position-based information can be associated with (e.g., added to) the representations of the words in the sentence to facilitate (e.g., enable) the self-attention component understanding or determining the order and arrangement of words in the sentence.

In certain embodiments, the respective self-attention components (e.g., 328, 330, and/or 332) can utilize three matrices, comprising a query matrix, key matrix, and value matrix, that can enable the respective self-attention components to determine, understand, and/or process relationships between words in a sentence (or other passage or collection of words). The query matrix can enable focusing on a word of interest in a sentence (or other passage or collection of words), the key matrix can determine or measure relevance between words in the sentence, and the value matrix can provide context that can facilitate determining or generating a final or overall contextual representation of the focus word. The query, key, and value matrices can operate together to enable the self-attention component (e.g., 328, 330, or 332) to desirably determine, identify, or capture the respective relationships and dependencies between respective words in the sentence.

With further regard to the query matrix, the query matrix can represent a focus word with regard to which the context is being determined by the self-attention component (e.g., 328, 330, or 332). Based at least in part on the results of analyzing the information relating to the sentence, the self-attention component can utilize the query matrix of the word to transform the word representation, and determine and/or generate a query vector that can be compared with other words in the sentence.

The self-attention component (e.g., 328, 330, or 332) can utilize the key matrix to determine and/or generate key vectors for the words in the sentence, based at least in part on the results of analyzing the information (e.g., the spectrogram information and/or the tokens) relating to the sentence. The self-attention component can utilize the key vectors to determine or measure the relevance or similarity between the focus word (e.g., utilizing the associated query vector) and other words in the sentence. A higher relevance or similarity score between the query vector associated with the focus word and a key vector can indicate a relatively stronger (e.g., a relatively more significant or greater) relationship between the respective (e.g., corresponding) words, whereas, conversely, a relatively lower relevance or similarity score between the query vector and the key vector can indicate a relatively weaker relationship between the respective words.

The self-attention component (e.g., 328, 330, or 332) can utilize the value matrix to determine and/or generate value vectors for the words in the sentence, wherein the respective value vectors can contain the respective contextual information of the respective words. The self-attention component, after determining (e.g., calculating) the respective relevance or similarity scores, based at least in part on the respective query vectors and key vectors, can determine a weighted sum of the value vectors. The self-attention component can determine the weights for each of the value vectors based at least in part on the relevance or similarity scores, which can thereby enable (and/or ensure that) the final or overall contextual representation to be (can be) influenced more by relevant words in the sentence. In some embodiments, as part of the self-attention process, the self-attention component (e.g., 328, 330, or 332) can employ, determine, adjust, and/or apply respective attention weights, such as, for example, query weight, key weight, and value weight, associated with the query component (e.g., query matrix), key component (e.g., key matrix), and the value component (e.g., value matrix), respectively, to facilitate determining, identifying, or capturing the respective relationships and dependencies between respective words in the sentence.

The respective MLP components (e.g., 334, 336, and/or 338) can be or can comprise respective feed-forward layers (e.g., respective feed-forward neural network layers) that can comprise neurons (e.g., fully connected neurons) that can have an activation function (e.g., nonlinear activation function or linear activation function). In some embodiments, the respective MLP components (e.g., 334, 336, and/or 338) can comprise three or more layers (e.g., an input layer, an output layer, and one or more layers (e.g., hidden layers) in between the input layer and the output layer) of nonlinearly activating nodes. For fully connected MLP components, each node in a layer can be associated with (e.g., can connect with a respective weight value to) the nodes in the following layer of the MLP component. In certain embodiments, the respective MLP components (e.g., 334, 336, and/or 338) can be trained and can learn using backpropagation techniques. For instance, in an MLP component (e.g., 334, 336, or 338), learning (e.g., as part of supervised learning) in the perceptron can be performed or can occur by modifying (e.g., adjusting, updating, or changing) connection weights (e.g., between nodes) after each item of data is processed based at least in part on the amount of error determined to be in the output relative to (e.g., as compared to) the expected output (e.g., expected result), wherein the error information can be backpropagated to facilitate the determining and modifying of the connection weights. The respective MLP components (e.g., 334, 336, and/or 338) can receive the respective output data from the respective self-attention components (e.g., 328, 330, and/or 332), analyze and process such respective output data, such as described herein, and transform the respective output data to generate output (e.g., encoded output data) that can be output (e.g., by the output layer of the MLP component) from the encoder component 310 and input to the decoder component 312.

In certain embodiments, the respective decoder blocks (e.g., 320, 322, and/or 324) of the decoder component 312 each can comprise respective self-attention components (e.g., 340, 342, and/or 344), respective cross-attention components (CRS-ATT) (e.g., 346, 348, and/or 350), and respective MLP components (e.g., 352, 354, and/or 356), wherein the respective self-attention components can be associated with (e.g., communicatively connected to) the respective cross-attention components, and the respective cross-attention components can be associated with the respective MLP components. The respective decoder blocks (e.g., 320, 322, and/or 324) of the decoder component 312 can receive the respective encoded information from the respective MLP components (e.g., 334, 336, and/or 338) of the respective encoder blocks (e.g., 314, 316, and/or 318) of the encoder component 310. The respective decoder blocks (e.g., 320, 322, and/or 324) of the decoder component 312 can analyze the respective encoded information, and can utilize the respective encoded representations contained in the respective encoded information as context to facilitate predicting, determining, and/or generating the output sequence of words (e.g., textual words) that can be representative of the words (e.g., spoken words) contained in the audio content. In some embodiments, the decoder component 312 can predict, determine, and/or generate one token, which can be representative of a word or subword, at a time (e.g., using autoregressive decoding or another decoding technique). In certain embodiments, the decoder component 312 can initiate (e.g., start or begin) decoding of encoded information (e.g., encoded information representative of a sentence or other collection of words) by using a special token, such as an SOT token (or beginning of sentence (BOS) token or other desired type of initializing token), as an initial input for analysis by a decoder block (e.g., 320, 322, or 324). The processing and decoding of the encoded information, and the predicting of next tokens, by the respective decoder blocks (e.g., 320, 322, and/or 324) of the decoder component 312 for the sentence (or other collection of words) can continue, for example, until an EOT token (or other desired special end token, such as an end-of-sentence (EOS) token) is processed by the decoder component 312.

The respective self-attention components (e.g., 340, 342, and/or 344) can be or can comprise a desired number of respective self-attention layers, and the respective self-attention components (e.g., 340, 342, and/or 344) of the decoder component 312 can be structured similar to, and/or can operate similar to, the respective self-attention components (e.g., 328, 330, and/or 332) of the encoder component 310, except that, for example, the respective self-attention components (e.g., 340, 342, and/or 344) of the decoder component 312 can operate on each word of the target sequence, and the self-attention layers of the respective self-attention components (e.g., 340, 342, and/or 344) of the decoder component 312 can attend to or analyze earlier positions in the output sequence, where future positions can be masked off. The respective self-attention components (e.g., 340, 342, and/or 344) can determine (e.g., compute) interaction between each target word with other target words of the target sequence.

The respective cross-attention components (e.g., 346, 348, and/or 350) can be or can comprise respective cross-attention layers that can be utilized to facilitate predicting, determining, and/or generating a next token based at least in part on the context represented in the encoded representation(s) contained in the portion of the encoded information being processed and/or one or more previous predicted tokens. As part of the decoding process, the respective cross-attention components (e.g., 346, 348, and/or 350) can determine (e.g., calculate) respective attention weights between the encoded information sequence from the encoder component 310 and the decoded information sequence generated by the decoder component 312. In some embodiments, when processing encoded information, the cross-attention component (e.g., 346, 348, or 350) can utilize query vectors, which can be taken from decoded information generated by the decoder component 312, and key vectors and value vectors that can be taken from the encoded information received from the encoder component 310.

Accordingly, during the respective operations of the decoding process, the respective self-attention components (e.g., 340, 342, and/or 344) and respective cross-attention components (e.g., 346, 348, and/or 350), while analyzing and processing the respective encoded information, can utilize attention, such as self-attention, cross-attention, and/or multi-head attention, to attend to the encoded representations contained in the respective encoded information and previously predicted tokens (e.g., tokens previously predicted and generated by the decoder component 312 with regard to decoding the encoded information). This can enable the decoder component 312 to determine which portions of the encoded information (e.g., which encoded representations or other portion of the encoded information) and the previously predicted tokens are relevant for predicting and generating the next token (e.g., next token that can be representative a next word or subword in the predicted token. sequence).

The respective MLP components (e.g., 352, 354, and/or 356) of the decoder component 312 can be or can comprise respective feed-forward layers, and can be similar to the respective MLP components (e.g., 334, 336, and/or 338) of the encoder component 310, except that the respective MLP components (e.g., 352, 354, and/or 356) of the decoder component 312 can be structured (e.g., configured) to facilitate decoding the encoded information received from the encoder component 310 and generate predictions (e.g., predict next token in a token sequence, the next token being representative of a word or subword), determinations, and/or probabilities regarding the respective words contained in the encoded information (e.g., corresponding to the audio content and associated spectrogram information), which can be output as output data (e.g., a sequence of predicted tokens that can be a textual transcript of the words recognized by the speech recognition model 104 with regard to the input information (e.g., spectrogram information and/or tokens representative of the spoken words) input to the speech recognition model 104).

As stated, decoder component 312 also can input the previously predicted tokens output from the respective MLP components (e.g., 352, 354, and/or 356) back into the decoder component 312 (e.g., the self-attention component (e.g., 340)) for further analysis and processing in connection with other portions of the encoded information, such as described herein. In some embodiments, the decoder component 312 can employ learned positional encoding as part of the inputting and processing of the tokens by the decoder component 312. In certain embodiments, the tokens can be in a multitask model training format, such as described herein.

With further regard to the FAL evaluator component 112, as part of each iteration of training of the speech recognition model 104, the FAL evaluator component 112 (e.g., the fidelity determination component 218, the accuracy determination component 220, latency determination component 222, and/or other component of the FAL evaluator component 112) can analyze (e.g., evaluate or compare) the output data (e.g., the predicted tokens or the transcription comprising the transcribed textual data), which can be generated and output by the speech recognition model 104, and the set of validation data or set of test data (e.g., the textual transcript data of the mixed language dataset, or a portion thereof, or information regarding or relating thereto). Based at least in part on the analysis results, the fidelity determination component 218 can determine the fidelity (e.g., fidelity score, rating, or value representative of the fidelity) to evaluate how well the speech recognition model 104, in the transcription generated by the speech recognition model 104, captures the content and meaning of the speech (e.g., mixed language speech) in the original audio content. The evaluation with regard to the fidelity (e.g., by the fidelity determination component 218) can involve assessing the accuracy of the transcription (e.g., accuracy of the words and/or characters in the transcription, as compared to the words spoken in the audio content) and ensuring that the transcribed textual data in the transcription retains the intended message, tone, and context of the spoken words in the audio content.

Also, as part of each model training iteration, based at least in part on the analysis results, the accuracy determination component 220 of the FAL evaluator component 112 can determine the accuracy and/or measure the accuracy or correctness (e.g., accuracy score, rating, or value representative of the accuracy) of the transcription generated by the speech recognition model 104. The accuracy factor can involve the accuracy determination component 220 determining and evaluating the ability of the speech recognition model 104 to correctly recognize and convert spoken words (e.g., spoken mixed language words) of the audio content into textual data (e.g., written text), including accurate representation of tones and pronunciation of respective words of the respective languages that were contained in the audio content.

As part of each model training iteration, the latency determination component 222 can determine, measure, or track the latency with regard to the amount of time it takes for the speech recognition model 104 to process the audio content (e.g., the spectrogram representative of the audio content comprising the mixed language speech) and generate the transcription representative of the spoken words (e.g., spoken mixed language words) contained in the audio content. In some embodiments, the latency determination component 222 can determine (e.g., calculate) a latency score, rating, or value (e.g., latency metric value) that can be representative of the amount of latency.

In some embodiments, the FAL evaluator component 112 can determine a FAL rating (e.g., a FAL score) that can indicate or relate to the fidelity, the accuracy, and the latency associated with the speech recognition performance and generation of the transcript representative of the spoken words presented in the audio content associated with (e.g., corresponding to or representative of) the mixed language dataset (e.g., for the iteration), based at least in part on (e.g., as a function of) the fidelity (e.g., the fidelity rating or score), the accuracy (e.g., the accuracy rating or score), and the latency (e.g., the latency rating or score), in accordance with the defined model management criteria. In certain embodiments, the FAL evaluator component 112 can determine (e.g., calculate) the FAL rating (e.g., the FAL score) based at least in part on (e.g., in accordance with, or as a function of) the following non-limiting example equation, as follows:

$$FAL = \alpha\mathcal{F} + \beta\left(1 - \frac{S+I+D}{N}\right)\cdot 100 + \gamma\left(1 + \frac{\mathcal{L}-1}{M-1}\cdot(100-1)\right),$$

wherein $\mathcal{F}$ can be or can represent the fidelity, $\mathcal{L}$ can be or can represent latency, M can be or can represent maximum latency, S can be or can represent the number of second language (e.g., English or other second language) word (or character) and first language (e.g., Chinese or other first language) character (or word) substitutions, I can be or can represent the number of second language word (or character) and first language character (or word) insertions, D can be or can represent the number of second language word (or character) and first language character (or word) deletions, N can be or can represent the number of second language words (or characters) and first language characters (or words) deletions in the reference, and a, B, and y can be or can represent respective weights (e.g., respective weight values) that can be assigned to each part of the equation based at least in part on respective scenarios (e.g., respective speech recognition or translation scenarios) or applications. The accuracy can be based at least in part on (e.g., can be a function of) the variables S, I, D, and/or N (e.g., accuracy can be equal to or a function of (1−(S+1+D)/N)). The disclosed techniques and equation for determining, estimating, and/or calculating accuracy with regard to speech recognition performance and textual transcript (e.g., speech recognition transcript) generation can be more desirable (e.g., more accurate, more suitable, enhanced, or optimal) than existing techniques for determining accuracy that only consider character errors in a transcript, and, overall, the disclosed FAL evaluation, FAL determinations, and FAL equation can be more desirable (e.g., more accurate, more suitable, enhanced, or optimal) than existing techniques (e.g., WER, CER, and other existing techniques) for determining performance, quality, and accuracy of speech recognition and generation of a textual transcript. With regard to the weight values, in a real-time speech recognition or translation scenario, where there may be a relatively high demand for quick responses (e.g., quick speech recognition responses), for example, the model manager component 102 (or another component or a user) can assign a relatively higher weight value for y. As another example, in certain digital human application scenarios, where the overall meaning of the conversation may be more desirable (e.g., wanted more, or more important) than word-for-word consistency, the model manager component 102 (or the other component or the user) can assign a relatively lower weight value for B.

It is to be appreciated and understood that this non-limiting example equation for determining the FAL rating is but one non-limiting example equation for determining the FAL rating with regard to speech recognition performance and generation of a transcript associated with a mixed language dataset by the speech recognition component 106, employing the speech recognition model 104. In other embodiments, the FAL evaluator component 112 can employ another desired equation (e.g., FAL rating determination equation) to determine a FAL rating with regard to speech recognition performance and generation of a transcript associated with a mixed language dataset by the speech recognition component 106, employing the speech recognition model 104, wherein such other desired equation can be based at least in part on the fidelity (e.g., the fidelity rating or score), the accuracy (e.g., the accuracy rating or score), and the latency (e.g., the latency rating or score).

In certain embodiments, additionally or alternatively, as part of each model training iteration, the FAL evaluator component 112 also can determine (e.g., calculate or measure) the WER, CER, and/or other error associated with the performance of speech recognition by the speech recognition model 104 based at least in part on the results of analyzing the transcription, comprising the transcribed textual data, and/or the predicted tokens in relation to (e.g., as compared to) the set of validation data or the set of test data.

During each model training iteration, the update component 122 can determine an update to the parameters, processes, operations, functions, training procedures (e.g., model training procedures), topics (e.g., seed topics), content collection, prompts (e.g., conversation prompts), simulated conversation generation, mixed language dataset generation, and/or other features of the trained model (e.g., of or associated with the model manager component 102) and/or the MLDGM component 110, and/or an update to parameters, hyperparameters, processes, operations, functions, and/or other features of the speech recognition model 104 and/or the speech recognition component 106, based at least in part on the FAL evaluation results (e.g., the fidelity, accuracy, and/or latency results, ratings, or scores; or the overall FAL rating or score), WER, CER, and/or other error determination associated with the performance of speech recognition by the speech recognition model 104 during the iteration, in accordance with the defined model management criteria. In some embodiments, the update component 122 can coordinate with the evaluator component 204 with regard to updates relating to content collection by the content collector component 202 and/or associated web crawlers or tools, and/or can coordinate with the assessment component 210 with regard to updates relating to prompts or conservation simulations to facilitate generation of mixed language datasets. The update component 122 can communicate respective update information to respective components of the MLDGM component 110, the trained model, the model manager component 102, the FAL evaluator component 112, the speech recognition model 104, the speech recognition component 106, the fine tuner component 114, the audio converter component 118, and/or other component (e.g., of the system 100) to facilitate updating (e.g., modifying, adjusting, or reconfiguring) these respective components based at least in part on the respective update information, in accordance with the defined model management criteria.

In some embodiments, in addition to determining the fidelity, the accuracy, the latency, the WER, the CER, and/or other error associated with the performance of speech recognition by the speech recognition model 104 during the iteration, a loss function associated with performance of the speech recognition can be determined. For instance, the speech recognition component 106 can comprise the loss determination component 302 that can determine (e.g., calculate) a loss function associated with the prediction of tokens during each iteration of training of the speech recognition model 104. The loss function can be a measure or determination of the discrepancy (e.g., the amount of error) between the prediction of tokens by the speech recognition model 104 with regard to performing speech recognition on the input data input to the speech recognition model 104 and the actual tokens of or representative of the input data. For instance, the loss determination component 302 can compare a first predicted token to a first actual token, which corresponds to the first predicted token with regard to the predicted token sequence and the actual token sequence (e.g., for one or more predicted token sequences and one or more corresponding actual token sequences), a second predicted token to a second actual token, which corresponds to the second predicted token with regard to the predicted token sequence and the actual token sequence, and/or another predicted token to another actual token, which corresponds to the other predicted token with regard to the predicted token sequence and the actual token sequence. Based at least in part on the results of the comparisons, the loss determination component 302 can determine whether the first predicted token satisfies a defined match criterion with regard to the first actual token (e.g., can determine whether the first predicted token matches or is the same as the first actual token, or otherwise satisfies the defined match criterion), determine whether the second predicted token satisfies the defined match criterion with regard to the second actual token, and/or determine whether the other predicted token satisfies the defined match criterion with regard to the other actual token. The loss determination component 302 can determine the loss function based at least in part on (e.g., as a function of) the results of the comparisons of the respective predicted tokens to the respective actual tokens. The higher the loss function is, the larger the discrepancy and/or the amount of error between the predicted tokens and the actual tokens. In certain embodiments, the loss determination component 302 can communicate loss function information relating to, indicating, or specifying the loss function with regard to a sequence of predicted tokens to the update component 304.

In some embodiments, the update component 304 can determine an update (e.g., modification, adjustment, reconfiguration, or change) to parameters, hyperparameters, a function, and/or a process of the speech recognition model 104 or the speech recognition component 106 based at least in part on the loss function associated with the sequence(s) of predicted tokens (e.g., based at least in part on the results of analyzing the loss function information associated with the sequence(s)) associated with the iteration of training of the speech recognition model 104, in accordance with the defined model management criteria. For instance, the update component 304 of the speech recognition component 106 can backpropagate or facilitate backpropagating the loss function (e.g., the loss associated with the loss function) through the speech recognition model 104. In certain embodiments, to facilitate such backpropagation of the loss function, the update component 304 can employ or perform (e.g., execute) one or more gradient-based enhancement (e.g., optimization) algorithms, techniques, or processes, such as stochastic gradient descent or another desired gradient-based enhancement algorithm, technique, or process, to determine updates to the parameters, hyperparameters, function, and/or process of the speech recognition model 104. The update to the parameters, hyperparameters, function, and/or process of the speech recognition model 104 can facilitate enhancing the accuracy and/or efficiency of the speech recognition model 104 in performing speech recognition on input data (e.g., input data representative of spoken words, such as mixed language spoken words, in audio content) to generate transcribed textual data representative of the spoken words contained or represented in the input data.

In certain embodiments, the update component 304 can communicate update information, which can relate to or can be with regard to the update to the parameters, hyperparameters, function, and/or process of the speech recognition model 104, to the fine tuner component 114. The fine tuner component 114 can update (e.g., modify, adjust, reconfigure, or change) the parameters, hyperparameters, function, and/or process of the speech recognition model 104 based at least in part on the update information.

In other embodiments, additionally or alternatively, the update component 304 can communicate, to the FAL evaluator component 112 or the update component 122 of the model manager component 102, update information relating to the loss function and/or the update (e.g., which can be a preliminary determination of the update) to the parameters, hyperparameters, function, and/or process of the speech recognition model 104. The FAL evaluator component 112 or the update component 122 of the model manager component 102 can determine an update to the parameters, hyperparameters, processes, operations, function, and/or other features of the speech recognition model 104 (and/or an update to the parameters, processes, operations, functions, training procedures, topics, content collection, prompts, simulated conversation generation, mixed language dataset generation, and/or other features of the trained model, the MLDGM component 110, and/or the model manager component 102), based at least in part on the results of the FAL evaluation, the loss function, the WER, the CER, and/or other error results, in accordance with the defined model management criteria, such as described herein. For example, the FAL evaluator component 112 or the update component 122 can reconcile the update information relating to the loss function with the other evaluation results (e.g., FAL evaluation results (e.g., FAL rating or score), WER, and/or CER), or can incorporate the update information relating to the loss function with the other evaluation results, as part of determining the update to the respective components, in accordance with the defined model management criteria. In some embodiments, the FAL evaluator component 112 or the update component 122 also can reconcile or incorporate any updates (e.g., updates relating to collection of items of content, conversation prompts, simulating conversations between speakers, and/or other function, operation, or feature) determined by the MLDGM component 110 with regard to enhancing determination and generation of mixed language datasets with or into updates determined the FAL evaluator component 112 or the update component 122, such as described herein.

The update to the parameters, processes, operations, functions, training procedures (e.g., model training procedures), topics (e.g., seed topics), content collection, prompts (e.g., conversation prompts), simulated conversation generation, mixed language dataset generation, and/or other features of the trained model (e.g., of or associated with the model manager component 102) and/or the MLDGM component 110 can enhance generation of a next (or subsequent) mixed language dataset(s) by the MLDGM component 110 that can be utilized for a next (or subsequent) iteration(s) of training (e.g., further training, refining of training, or fine tuning) of the speech recognition model 104, which can enhance training and performance of the speech recognition model 104 and can result in or produce an enhanced (e.g., improved or optimized) trained speech recognition model 104. The update to the parameters, hyperparameters, processes, operations, functions, and/or other features of the speech recognition model 104 and/or the speech recognition component 106 can enhance the training and performance of the speech recognition model 104 and can result in or produce an enhanced trained speech recognition model 104.

To facilitate improving of performance and training of the speech recognition model 104, the model manager component 102, the speech recognition component 106, and the other components of the system 100 can perform their respective functions and operations for a desired number of iterations of training of the speech recognition model 104, for example, until the performance of the (trained) speech recognition model 104 is determined (e.g., by the model manager component 102) to satisfy (e.g., meet or exceed, or be at or greater than) defined speech recognition model performance criteria (e.g., with regard to the fidelity, accuracy, latency, WER, CER, loss function, and/or other desired performance metric), or until defined model training cessation (e.g., stopping) criteria (e.g., a defined threshold model training cessation criterion) is determined (e.g., by the model manager component 102) to be satisfied (e.g., until the number of iterations of training of the speech recognition model 104 satisfies (e.g., is at or greater than) a defined threshold number of iterations of model training, or until the improvement in training and/or performance of the speech recognition model 104 between respective (e.g., consecutive) iterations is lower than a defined threshold amount of improvement in training and/or performance), in accordance with the defined model management criteria, at least with regard to an initial training phase of training of the speech recognition model 104. As desired, subsequent to the training of the trained speech recognition model 104, the model manager component 102, the speech recognition component 106, and the other components of the system 100 also can perform updates and/or refinements (e.g., periodic or dynamic updates and/or refinements) to the trained speech recognition model 104 to further improve performance of the trained speech recognition model 104.

With further regard to the model manager component 102 and the speech recognition component 106, in accordance with various embodiments, the model manager component 102 and/or the speech recognition component 106 respectively can be, can comprise, or can employ an AI component. The AI component can perform an AI-based analysis on data, such as information relating to generation of mixed language datasets, training of the speech recognition model 104, performance of the speech recognition model 104, performing FAL evaluations and/or other evaluations (e.g., WER, CER, or loss function), updating (e.g., adapting, modifying, or reconfiguring) the parameters, processes, operations, functions, training procedures, topics, content collection, prompts, simulated conversation generation, mixed language dataset generation, and/or other features of the trained model of or associated with the model manager component 102, updating the parameters, hyperparameters, processes, operations, functions, and/or other features of the speech recognition model 104 and/or the speech recognition component 106, feedback and/or backpropagation relating to performance and/or training of the speech recognition model 104, and/or other aspects or features associated with the model manager component 102, the speech recognition component 106, and/or the speech recognition model 104. In some embodiments, with regard to a model (e.g., the trained model of the model manager component 102, or the speech recognition model 104), and depending on the type of model, the AI component can input such information into the (trained) model for analysis by the model to update the model or to generate output data or results (e.g., mixed language dataset, transcription comprising the transcribed textual data recognized by the speech recognition model, predicted tokens, model update information that can be utilized to update another model (e.g., the speech recognition model 104), AI-related data, and/or other data or results) based at least in part on the analysis of the input information.

In connection with or as part of such an AI-based analysis, the AI component can employ, build (e.g., construct or create), and/or import, AI-based techniques and algorithms, AI models (e.g., untrained or trained models), neural networks (e.g., untrained or trained neural networks), decision trees, Markov chains (e.g., trained Markov chains), and/or graph mining to render and/or generate predictions, inferences, calculations, prognostications, estimates, derivations, forecasts, detections, and/or computations that can facilitate determining or learning data patterns in data, determining or learning a correlation, relationship, or causation between an item(s) of data and another item(s) of data (e.g., occurrence of the other item(s) of data or an event relating thereto), determining or learning a correlation, relationship, or causation between an event and another event (e.g., occurrence of another event), determining or learning about relationships between components (e.g., encoder component, decoder component, activator component, encoder blocks, decoder blocks, or other components or functions) of or associated with the system 100, determining or learning about enhancements to mixed language datasets and/or mixed language dataset generation, determining or learning an update to the speech recognition model 104, determining or learning enhancements to the fidelity, accuracy, and/or latency associated with performance of speech recognition by the speech recognition model 104, performing other desired functions or operations, and/or automating one or more functions or features of the disclosed subject matter, as more fully described herein.

The AI component can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component can examine the entirety or a subset of the data (e.g., model training data; information relating to a mixed language dataset(s); information relating to FAL evaluations and/or other evaluations (e.g., WER, CER, or loss function); the feedback information; the backpropagation information; and/or other information, such as described herein) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

In some embodiments, with regard to probabilities, the AI component, the trained model(s), or trained speech recognition model 104 can employ one or more threshold probabilities (e.g., threshold probability values) to facilitate making a determination. As a non-limiting example, in making a determination relating to generation of a mixed language dataset for use in training the speech recognition model 104, as part of the AI-based analysis of information, the AI component and/or the trained model(s) can determine a probability (e.g., a probability of performance enhancement relating to speech recognition performance by the speech recognition model 104), and can determine whether the probability (e.g., probability value) satisfies (e.g., meets or exceeds; or is at or greater than) a defined and applicable threshold probability (e.g., threshold minimum probability value relating to speech recognition performance enhancement). The AI component and/or the trained model(s) can make a determination (or prediction or inference) relating to the generation of the mixed language dataset based at least in part on the results of analyzing (e.g., comparing) the probability to the defined and applicable threshold probability (e.g., can determine a highest probability value (or a group of higher probability values) that satisfies the threshold minimum probability value). In certain embodiments, a determination (or prediction or inference) can be made by the AI component, the trained model(s), or the trained speech recognition model 104 without utilizing any threshold probability. For example, the AI component, the trained model(s), or the trained speech recognition model 104 can perform such determination (or prediction or inference) based at least in part on the probability being determined to be the highest probability, as compared to other probabilities, associated with or relating to generation of a mixed language dataset, a performance evaluation (e.g., FAL evaluation, WER, CER, or loss function), a parameter, a hyperparameter, a function, an operation, a process, a training procedure, or other aspect or feature under consideration, without utilizing, and without regard to, any threshold probability.

Such determinations can result in the construction of new events or actions from a set of observed events and/or stored event data, whether or not the events are correlated in close temporal proximity, and whether the events and data come from one or several event and data sources. In certain embodiments, components (e.g., the AI component, the trained model, the speech recognition model 104, and/or another component) disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

In some embodiments, the AI component can employ a classifier that can perform an AI-based analysis on data. A classifier can map an input attribute vector, z=(z1, z2, z3, z4, . . . , zn), to a confidence that the input belongs to a class, as by f (2)=confidence (class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

With further regard to the processor component 224 and the data store 226 of or associated with the model manager component 102, the processor component 224 can be associated with (e.g., communicatively connected to) and can work in conjunction with other components of the model manager component 102 and/or the system 100, including the speech recognition component 106, the MLDGM component 110, the FAL evaluator component 112, the fine tuner component 114, the audio recorder component 116, the audio converter component 118, the tokenizer component 120, the update component 122, the data store 226, and/or other components of the model manager component 102 and/or the system 100, to facilitate performing the various functions and operations of the model manager component 102 and/or the system 100. The processor component 224 can employ one or more processors (e.g., one or more central processing units (CPUs), accelerators, graphics processing units (GPUs), application-specific integrated circuits (ASICs), field-programmable gate arrays (FPGAs), microprocessors, controllers, and/or microcontrollers that can process information relating to data, instructions, files, transcripts, services, applications, content collection, language datasets (e.g., mixed language datasets), words, subwords, spoken words, tokens, audio content, multimedia content, spectrograms, AI/ML-based models, AI-related data, topics, loss function, FAL evaluations, WER, CER, training data, feedback information, updates, predictions, inferences, thresholds (e.g., maximum, minimum, or other threshold values), weight values, data processing operations, messages, notifications, alarms, alerts, preferences (e.g., user or client preferences), hash values, metadata, hyperparameters, parameters, tables, mappings, policies, the defined model management criteria, algorithms (e.g., enhanced mixed language dataset generation management algorithms, enhanced FAL evaluation algorithms, enhanced model training algorithms, AI algorithms, hash algorithms, data compression algorithms, data decompression algorithms, and/or other algorithm), interfaces, protocols, tools, and/or other information, to facilitate operation of the model manager component 102 and/or the system 100, and control data flow between the model manager component 102 and/or other components (e.g., speech recognition component 106, the fine tuner component 114, the audio recorder component 116, the audio converter component 118, the tokenizer component 120, network equipment or components, a communication network, a device (e.g., 108), a node, an application, a service, a user, or other entity) associated with the model manager component 102 and/or the system 100.

The data store 226 can store data structures (e.g., user data, metadata), code structure(s) (e.g., modules, objects, hashes, classes, procedures) or instructions, information relating to data, instructions, files, transcripts, services, applications, content collection, language datasets (e.g., mixed language datasets), words, subwords, spoken words, tokens, audio content, multimedia content, spectrograms, AI/ML-based models, AI-related data, topics, loss function, FAL evaluations, WER, CER, training data, feedback information, updates, predictions, inferences, thresholds (e.g., maximum, minimum, or other threshold values), weight values, data processing operations, messages, notifications, alarms, alerts, preferences (e.g., user or client preferences), hash values, metadata, hyperparameters, parameters, tables, mappings, policies, the defined model management criteria, algorithms (e.g., enhanced mixed language dataset generation management algorithms, enhanced FAL evaluation algorithms, enhanced model training algorithms, AI algorithms, hash algorithms, data compression algorithms, data decompression algorithms, and/or other algorithm), interfaces, protocols, tools, and/or other information, to facilitate controlling or performing operations associated with the model manager component 102 and/or the system 100. The data store 226 can comprise volatile and/or non-volatile memory, such as described herein. In an aspect, the processor component 224 can be functionally coupled (e.g., through a memory bus) to the data store 226 in order to store and retrieve information desired to operate and/or confer functionality, at least in part, to the model manager component 102, the speech recognition component 106, the MLDGM component 110, the FAL evaluator component 112, the fine tuner component 114, the audio recorder component 116, the audio converter component 118, the tokenizer component 120, the update component 122, the processor component 224, the data store 226, and/or other component of the model manager component 102 and/or the system 100, and/or substantially any other operational aspects of the model manager component 102 and/or the system 100.

The data store 226 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), flash memory, non-volatile memory express (NVMe), NVMe over fabric (NVMe-oF), persistent memory (PMEM), or PMEM-oF. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

With further regard to the processor component 306 and the data store 308 of or associated with the speech recognition component 106, the processor component 306 can be associated with (e.g., communicatively connected to) and can work in conjunction with other components of the speech recognition component 106 and/or the system 100, including the fine tuner component 114, the audio converter component 118, the tokenizer component 120, the loss determination component 302, the update component 304, the audio recorder component 116, the data store 308, and/or other components of the speech recognition component 106 and/or the system 100, to facilitate performing the various functions and operations of the speech recognition component 106 and/or the system 100. The processor component 224 can employ one or more processors (e.g., one or more CPUs, accelerators, GPUs, ASICs, FPGAs, microprocessors, controllers, and/or microcontrollers that can process information relating to data, instructions, files, transcripts, services, applications, language datasets (e.g., mixed language datasets), words, subwords, spoken words, tokens, audio content, multimedia content, spectrograms, AI/ML-based models, AI-related data, topics, loss function, training data, feedback and/or backpropagation information, updates, predictions, inferences, thresholds (e.g., maximum, minimum, or other threshold values), weight values, data processing operations, messages, notifications, alarms, alerts, preferences (e.g., user or client preferences), hash values, metadata, hyperparameters, parameters, tables, mappings, policies, the defined model management criteria, algorithms (e.g., enhanced speech recognition performance and management algorithms, enhanced model training algorithms, AI algorithms, hash algorithms, data compression algorithms, data decompression algorithms, and/or other algorithm), interfaces, protocols, tools, and/or other information, to facilitate operation of the speech recognition component 106 and/or the system 100, and control data flow between the speech recognition component 106 and/or other components (e.g., model manager component 102, the audio recorder component 116, network equipment or components, a communication network, a device, a node, an application, a service, a user, or other entity) associated with the speech recognition component 106 and/or the system 100.

The data store 308 can store data structures (e.g., user data, metadata), code structure(s) (e.g., modules, objects, hashes, classes, procedures) or instructions, information relating to data, instructions, files, transcripts, services, applications, language datasets (e.g., mixed language datasets), words, subwords, spoken words, tokens, audio content, multimedia content, spectrograms, AI/ML-based models, AI-related data, topics, loss function, training data, feedback and/or backpropagation information, updates, predictions, inferences, thresholds (e.g., maximum, minimum, or other threshold values), weight values, data processing operations, messages, notifications, alarms, alerts, preferences (e.g., user or client preferences), hash values, metadata, hyperparameters, parameters, tables, mappings, policies, the defined model management criteria, algorithms (e.g., enhanced speech recognition performance and management algorithms, enhanced model training algorithms, AI algorithms, hash algorithms, data compression algorithms, data decompression algorithms, and/or other algorithm), interfaces, protocols, tools, and/or other information, to facilitate controlling or performing operations associated with the speech recognition component 106 and/or the system 100. The data store 308 can comprise volatile and/or non-volatile memory, such as described herein. In an aspect, the processor component 306 can be functionally coupled (e.g., through a memory bus) to the data store 308 in order to store and retrieve information desired to operate and/or confer functionality, at least in part, to the speech recognition component 106, the speech recognition model 104, the fine tuner component 114, the audio converter component 118, the tokenizer component 120, the loss determination component 302, the update component 304, the processor component 306, the data store 308, and/or other component of the speech recognition component 106 and/or the system 100, and/or substantially any other operational aspects of the speech recognition component 106 and/or the system 100.

Turning to FIGS. 4 and 5 (along with FIGS. 1-3), FIG. 4 presents a diagram of non-limiting example speech recognition results 400 relating to speech recognition performed with regard to an audio recording comprising spoken Cantonese words by a non-limiting example trained speech recognition model (e.g., Whisper-MCE model) that is trained using the enhanced mixed language datasets and enhanced FAL evaluation techniques described herein and certain other trained speech recognition models trained using existing language datasets and existing training techniques, and FIG. 5 presents a diagram of non-limiting example speech recognition results 500 relating to speech recognition performed with regard to an audio recording comprising spoken mixed Cantonese and English words by the non-limiting example trained speech recognition model (e.g., Whisper-MCE model) and the certain other trained speech recognition models, in accordance with various aspects and embodiments of the disclosed subject matter. The non-limiting example trained speech recognition model can be a Whisper-small model that was trained and fine-tuned using the enhanced mixed language datasets and the enhanced FAL evaluation techniques described herein, wherein, in this non-limiting example, the enhanced mixed language datasets can comprise Cantonese and English language words, and this example trained speech recognition model can be referred to as Whisper-MCE. The other trained speech recognition models comprise a trained Whisper-large speech recognition model (Whisper-large model (e.g., Whisper-large-v2 model)) and a trained Whisper-small speech recognition model (Whisper-small model) that were trained using existing language datasets and training techniques, wherein the existing language datasets comprised Cantonese and English language words.

For applications in the real world, latency and accuracy can be significant factors in determining or deciding the experience (e.g., the experience of users) of speech recognition performed by a speech recognition application, service, or model. Looking to desirably balance both latency and accuracy for speech recognition applications, the Whisper-small model was selected as a starting model to utilize for training and fine tuning (e.g., utilizing the enhanced mixed language datasets, and the enhanced FAL evaluations and updates) to produce the trained Whisper-MCE model. The trained Whisper-MCE model, by being based in part on the Whisper-small model as the starting point, can have a desirably smaller model size and lower computational and resource usage (e.g., lower computational and resource requirements), as compared to the Whisper-large or other larger models, while still maintaining and/or achieving desirable (e.g., suitable, acceptable, useful, beneficial, or reasonable) accuracy in speech recognition performance.

The example speech recognition results 400 comprise example speech recognition results 402 for speech recognition performed by the trained Whisper-large model on audio recording related information comprising 18 seconds(s) of spoken words in Cantonese language, example speech recognition results 404 for speech recognition performed by the trained Whisper-small model on the audio recording related information comprising the 18*s* of spoken words in Cantonese language, and example speech recognition results 406 for speech recognition performed by the trained Whisper-MCE model on the audio recording related information comprising the 18*s* of spoken words in Cantonese language. The respective speech recognition results 402, 404, and 406 can present the respective recognition results 408 and the respective latencies 410 associated with the respective performances of speech recognition on the audio recording related information comprising the spoken words in Cantonese language.

The example speech recognition results 500 comprise example speech recognition results 502 for speech recognition performed by the trained Whisper-large model on audio recording related information comprising 15 s of mixed language spoken words in Cantonese and English languages, example speech recognition results 504 for speech recognition performed by the trained Whisper-small model on the audio recording related information comprising the 15*s* of mixed language spoken words in Cantonese and English languages, and example speech recognition results 506 for speech recognition performed by the trained Whisper-MCE model on the audio recording related information comprising the 15*s* of mixed language spoken words in Cantonese and English languages. The respective speech recognition results 502, 504, and 506 can present the respective recognition results 508 and the respective latencies 510 associated with the respective performances of speech recognition on the audio recording related information comprising the mixed language spoken words in Cantonese and English languages.

As can be observed from the respective example speech recognition results 402, 404, and 406 presented in FIG. 4, the respective example speech recognition results 502, 504, and 506 presented in FIG. 5, the trained Whisper-MCE model can provide speech recognition results that can be significantly more accurate than the trained Whisper-small model, and at least comparable to the accuracy of the trained Whisper-large model, particularly with regard to the mixed language spoken words in Cantonese and English languages, while the trained Whisper-MCE model can have a desirably (e.g., significantly) lower latency (e.g., less speech recognition processing and/or reaction time) than the trained Whisper-large model (e.g., the trained Whisper-MCE model can have a desirably low 2.6 s latency and the trained Whisper-large model can have a significantly higher 6.4 s latency, with regard to performing speech recognition on the audio recording related information comprising the mixed language spoken words in Cantonese and English languages) and comparable to the lower latency of the trained Whisper-small model (e.g., 2.5 s). The example speech recognition results 400 and example speech recognition results 500 (particularly the example speech recognition results 500) demonstrate that the trained Whisper-MCE model, when compared to other types of models, including the trained Whisper-large model, can outperform the existing baseline models in various and multiple aspects and metrics, including, for example, accurate content capture (e.g., the trained Whisper-MCE model can have more accurate content capture), recognition accuracy (e.g., the trained Whisper-MCE model can have higher recognition accuracy), and speech recognition speed (e.g., the trained Whisper-MCE model can have faster speech recognition speed). That is, the trained Whisper-MCE model, when compared to the trained Whisper-large model (e.g., baseline Whisper-large-v2 model), can have a superior ability to accurately capture the content of the original audio of the mixed language speech, can achieve higher recognition accuracy, and can exhibit faster recognition speed, and can thereby outperform other existing models in the task of recognizing mixed language speech. Thus, as can be observed from the example speech recognition results 400 and example speech recognition results 500, the trained Whisper-MCE model, which is trained and fined tuned using the enhanced mixed language datasets and enhanced FAL evaluation techniques described herein, can be a more desirable (e.g., more useful, more acceptable, enhanced, or optimal) for speech recognition (e.g., speech recognition applications) than existing trained Whisper models, such as the existing trained Whisper-large model and existing trained Whisper-small model, that are trained using existing language datasets and existing training techniques, particularly with regard to speech recognition performed on spoken mixed language words.

It is to be appreciated and understood that one or more components (e.g., the model manager component 102, the speech recognition component 106, the device 108, the fine tuner component 114, the audio recorder component 116, the audio converter component 118, the tokenizer component 120, the AI component, or other component) of the systems (e.g., system 100 or other system) or methods described herein can comprise or be associated with various other types of components, such as display screens (e.g., touch screen displays or non-touch screen displays), audio functions (e.g., amplifiers, speakers, or audio interfaces), or other interfaces, to facilitate presentation of information to users, entities, or other components (e.g., other devices or other servers), and/or to perform other desired functions or operations.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 6-11. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 6:
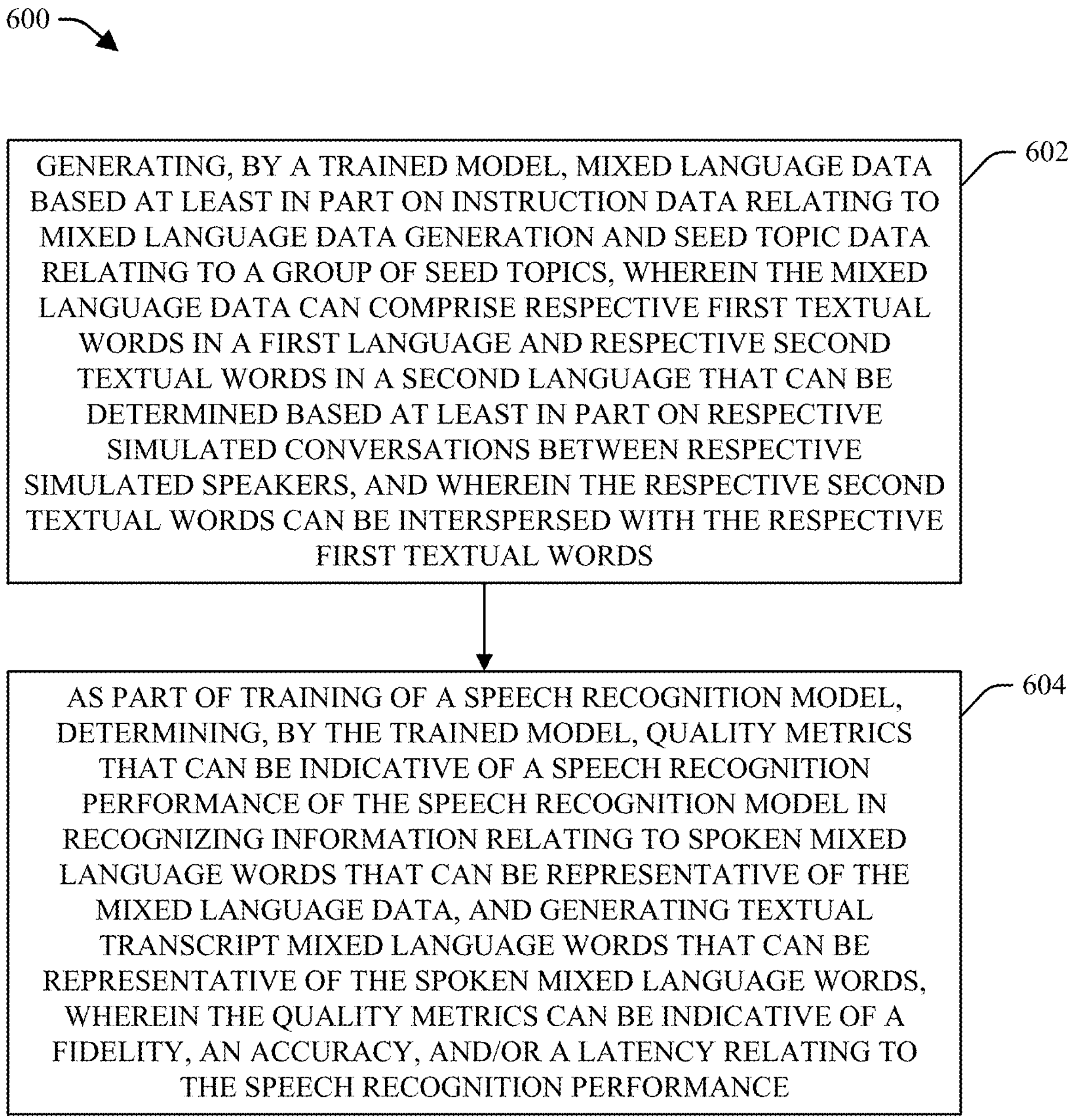
FIG. 6 illustrates a flow chart of an example method that can desirably train a speech recognition model that can desirably recognize mixed language words in speech and convert those words to textual data, in accordance with various aspects and embodiments of the disclosed subject matter.

FIG. 6 illustrates a flow chart of an example method 600 that can desirably (e.g., automatically, dynamically, suitably, efficiently, reliably, enhancedly, and/or optimally) train a speech recognition model (e.g., an AI-based speech-to-text model) that can desirably (e.g., accurately, efficiently, reliably, enhancedly, and/or optimally) recognize mixed language words in speech and convert those words to textual data, in accordance with various aspects and embodiments of the disclosed subject matter. The method 600 can be employed by, for example, a system comprising the model manager component, that can comprise or be associated with the processor component, the data store, and/or other components. The model manager component can comprise the trained model (e.g., trained GPT-4 model or other type of trained AI-based model) that can comprise or be associated with the MLDGM component and the FAL evaluator component.

At 602, mixed language data can be generated by a trained model based at least in part on instruction data relating to mixed language data generation and seed topic data relating to a group of seed topics, wherein the mixed language data can comprise respective first textual words in a first language and respective second textual words in a second language that can be determined based at least in part on respective simulated conversations between respective simulated speakers, and wherein the respective second textual words can be interspersed with the respective first textual words. The model manager component, employing the trained model and the MLDGM component, can determine and generate the mixed language data (e.g., an enhanced mixed language dataset) based at least in part on the instruction data and the seed topic data. The mixed language data can comprise the respective first textual words in the first language and. the respective second textual words in the second language that can be determined (e.g., by the trained model and/or the MLDGM component) based at least in part on the respective simulated conversations between the respective simulated speakers, and wherein the respective second textual words can be interspersed with the respective first textual words, such as described herein.

At 604, as part of training of a speech recognition model, quality metrics can be determined by the trained model, wherein the quality metrics can be indicative of a speech recognition performance of the speech recognition model in recognizing information relating to spoken mixed language words that can be representative of the mixed language data, and generating textual transcript mixed language words that can be representative of the spoken mixed language words, wherein the quality metrics can be indicative of a fidelity, an accuracy, and/or a latency relating to the speech recognition performance. As part of the training of the speech recognition model, the model manager component, employing the trained model and the FAL evaluator component, can determine the quality metrics, wherein the quality metrics can be indicative of the speech recognition performance of the speech recognition model in recognizing information relating to the spoken mixed language words that can be representative of the mixed language data, and generating the textual transcript mixed language words that can be representative of the spoken mixed language words, wherein the quality metrics can be indicative of the fidelity, the accuracy, and/or the latency relating to the speech recognition performance, such as described herein.

Figure 7:
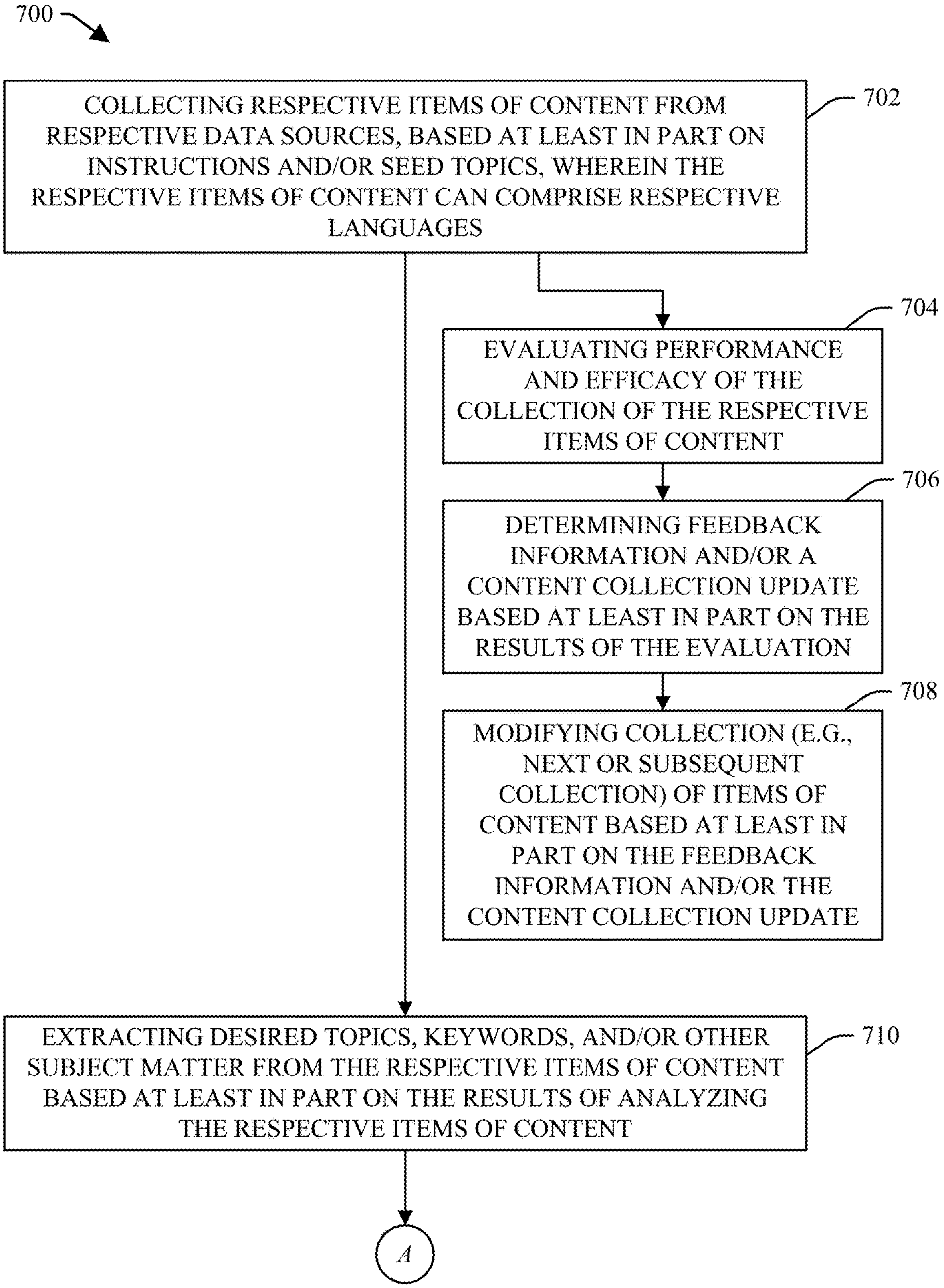
FIGS. 7 and 8 depict a flow chart of an example method that can desirably determine and generate an enhanced mixed language dataset that can be utilized to train a speech recognition model to enable the speech recognition model to desirably recognize mixed language words in speech and convert those words to textual data, in accordance with various aspects and embodiments of the disclosed subject matter.
Figure 8:
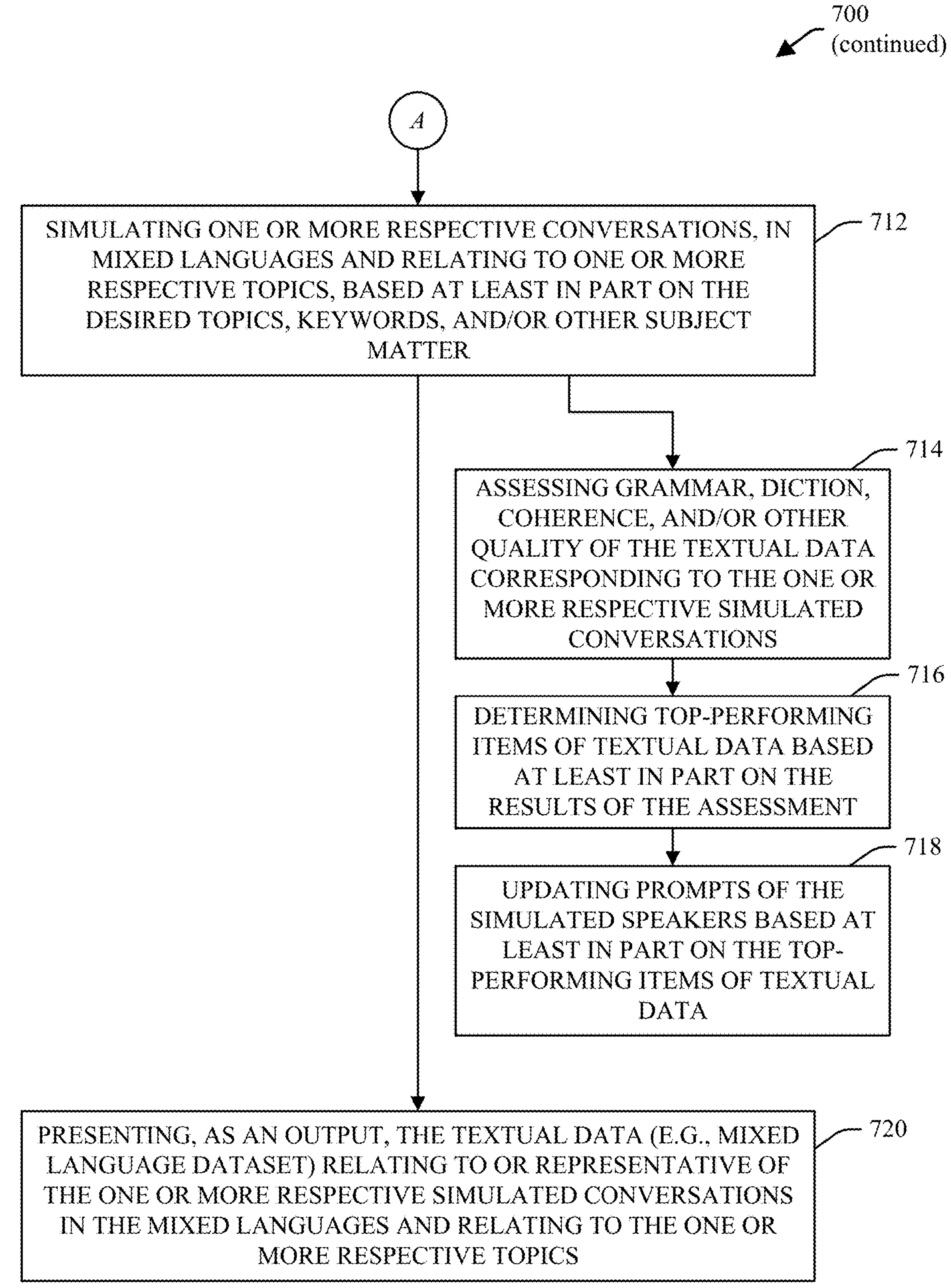

FIGS. 7 and 8 depict a flow chart of an example method 700 that can desirably (e.g., automatically, dynamically, suitably, efficiently, reliably, enhancedly, and/or optimally) determine and generate an enhanced mixed language dataset that can be utilized to train a speech recognition model (e.g., an AI-based speech-to-text model) to enable the speech recognition model to desirably (e.g., accurately, efficiently, reliably, enhancedly, and/or optimally) recognize mixed language words in speech and convert those words to textual data, in accordance with various aspects and embodiments of the disclosed subject matter. The method 700 can be employed by, for example, a system comprising the model manager component that can comprise or be associated with the processor component, the data store, and/or other components. The model manager component can comprise the trained model (e.g., trained GPT-4 model or other type of trained AI-based model) that can comprise or be associated with the MLDGM component. The MLDGM component (e.g., employing the trained model) can comprise, for example, the content collector component, evaluator component, update component, extractor component, conversation simulator component, assessment component, and/or other component, such as described herein. The model manager component can manage (e.g., control) the performance of the various operations of the method 700.

At 702, respective items of content can be collected from respective data sources, based at least in part on instructions and/or seed topics, wherein the respective items of content can comprise respective languages. For instance, the content collector component (e.g., the engineer agent) can utilize web crawlers and/or other tools to search for and/or collect (e.g., retrieve) the respective items of content from the respective data sources (e.g., respective web or online sites, servers, and/or devices) based at least in part on the instructions (e.g., instructions for data collection) and/or the seed topics. The content collector component can perform this content collection over a desired period of time. The respective items of content can comprise respective items of video content, respective items of audio content, and/or respective items of textual content (e.g., articles, news items, video content, audio content, multimedia content, and/or other type of content) that can be in respective languages, comprising at least two languages (e.g., Cantonese, English, and/or another language). In accordance with various embodiments, the method 700 can proceed to reference numeral 704 and/or reference numeral 710.

At 704, performance and efficacy of the collection of the respective items of content can be evaluated. The evaluator component (e.g., the critic agent) can evaluate the performance and efficacy of the collection of the respective items of content by the web crawlers and/or other tools developed and/or utilized by the content collector component to ensure desirable data diversity in the collected content items, check for and identify errors in the collected items of content, check and determine efficiency in the collection of the respective items of content, check for and determine adherence to specifications and/or guidelines relating to collection of content (e.g., ethical, instructed, or specified web scraping or data collection guidelines).

At 706, feedback information and/or a content collection update can be determined based at least in part on the results of the evaluation. The evaluator component can determine and generate the feedback information and/or the content collection update based at least in part on the results of the results of the evaluation of the performance and the efficacy of the collection of the respective items of content.

At 708, collection (e.g., next or subsequent collection) of items of content can be modified based at least in part on the feedback information and/or the content collection update. The evaluator component or another component (e.g., the update component of the mixed language data generation manager component) can modify (e.g., update) the collection of the items of content by the web crawlers and/or the other tools of the content collector component based at least in part on the feedback information and/or the content collection update to enhance (e.g., improve) the collection of items of content by the content collector component.

At 710, desired topics, keywords, and/or other subject matter can be extracted from the respective items of content based at least in part on the results of analyzing the respective items of content. The extractor component (e.g., the manager agent) can analyze the respective items of content, and, based at least in part on the analysis results, can identify and/or extract the desired (e.g., relevant and/or wanted) topics, keywords, and/or other subject matter in and/or from the respective items of content. For instance, the extractor component can employ desired trained natural language processing models that can identify themes, topics, keywords, and/or other desired subject matter that can be prevalent (e.g., frequently or commonly occurring) in the respective items of content based at least in part on the results of the analysis (e.g., AI-based analysis) of the respective items of content. At this point, the method 700 can proceed to reference point A, wherein the method 700 can proceed from reference point A as depicted in FIG. 8 and described herein.

At 712, one or more respective conversations, in mixed languages and relating to one or more respective topics, can be simulated based at least in part on the desired topics, keywords, and/or other subject matter. The conversation simulator component (e.g., the speaker agent) can simulate the one or more respective conversations, relating to the one or more respective topics, between respective speakers (e.g., simulated speakers) speaking in the mixed languages (e.g., at least two languages, such as Cantonese and English) based at least in part on the desired topics, keywords, and/or other subject matter extracted from the respective items of content. A simulated conversation between respective speakers can be a simulation of how speakers (e.g., local speakers speaking the mixed languages) can be expected to discuss (e.g., may or probably would discuss) the identified topic(s), with different prompts (e.g., conversation prompts) based at least in part on (e.g., using) the desired (e.g., relevant and/or wanted) topics, keywords, and/or other subject matter. With regard to each of the one or more respective conversations being simulated, the respective speakers of the simulated conversation can chat with each other (e.g., as operated or managed by the conversation simulator component), and the conversation simulator component can generate textual data based at least in part on (e.g., corresponding to, representative of, or transcription of) the simulated conversation. In accordance with various embodiments, the method 700 can proceed to reference numeral 714 and/or reference numeral 720.

At 714, grammar, diction, coherence, and/or other quality of the textual data corresponding to the one or more respective simulated conversations can be assessed. At 716, top-performing items of textual data can be determined based at least in part on the results of the assessment. At 718, prompts of the simulated speakers can be updated (e.g., enhanced or refined) based at least in part on the top-performing items of textual data. The assessment component (e.g., the commentator agent) can assess (e.g., evaluate) the grammar, diction, coherence, and/or other quality (e.g., quality characteristic) of the textual data corresponding to the one or more respective simulated conversations between the respective speakers (e.g., simulated speakers) in the mixed languages. The assessment component can evaluate the textual data to ensure that the textual data of the one or more respective simulated conversations satisfy (e.g., meet or exceed) desired (e.g., defined and/or high) linguistic standards and is representative of natural language that typically can be used in mixed-language contexts. In some embodiments, the assessment component can employ or incorporate a mechanism that can respectively score (e.g., determine or calculate a grammar score, diction score, coherence score, and/or other quality metric score), sort, and/or rank respective items of the textual data based at least in part on the quality metrics (e.g., grammar, diction, coherence, and/or other quality metric). The assessment component can use or select the top-performing datasets (e.g., top-performing textual data items) of the textual data (e.g., the top-k data) to update (e.g., modify and/or enhance) prompts of the speakers (e.g., the simulated speakers of the speaker agent), thereby enabling a continuous loop (e.g., feedback loop) of improvement that can refine (e.g., enhance) the data output (e.g., mixed language textual data) in successive cycles (e.g., iterations).

At 720, the textual data (e.g., mixed language dataset) relating to or representative of the one or more respective simulated conversations in the mixed languages and relating to the one or more respective topics, can be presented as an output. The MLDGM component can present (e.g., communicate, display, or otherwise present), as an output, the textual data relating to or representative of the one or more respective simulated conversations in the mixed languages (e.g., can present, as the output, information relating to the enhanced mixed language dataset. In certain embodiments, additionally or alternatively, the MLDGM component (e.g., employing the speech generator component) can generate, and present as an output, audio content corresponding to and/or representative of the textual data.

Figure 9:
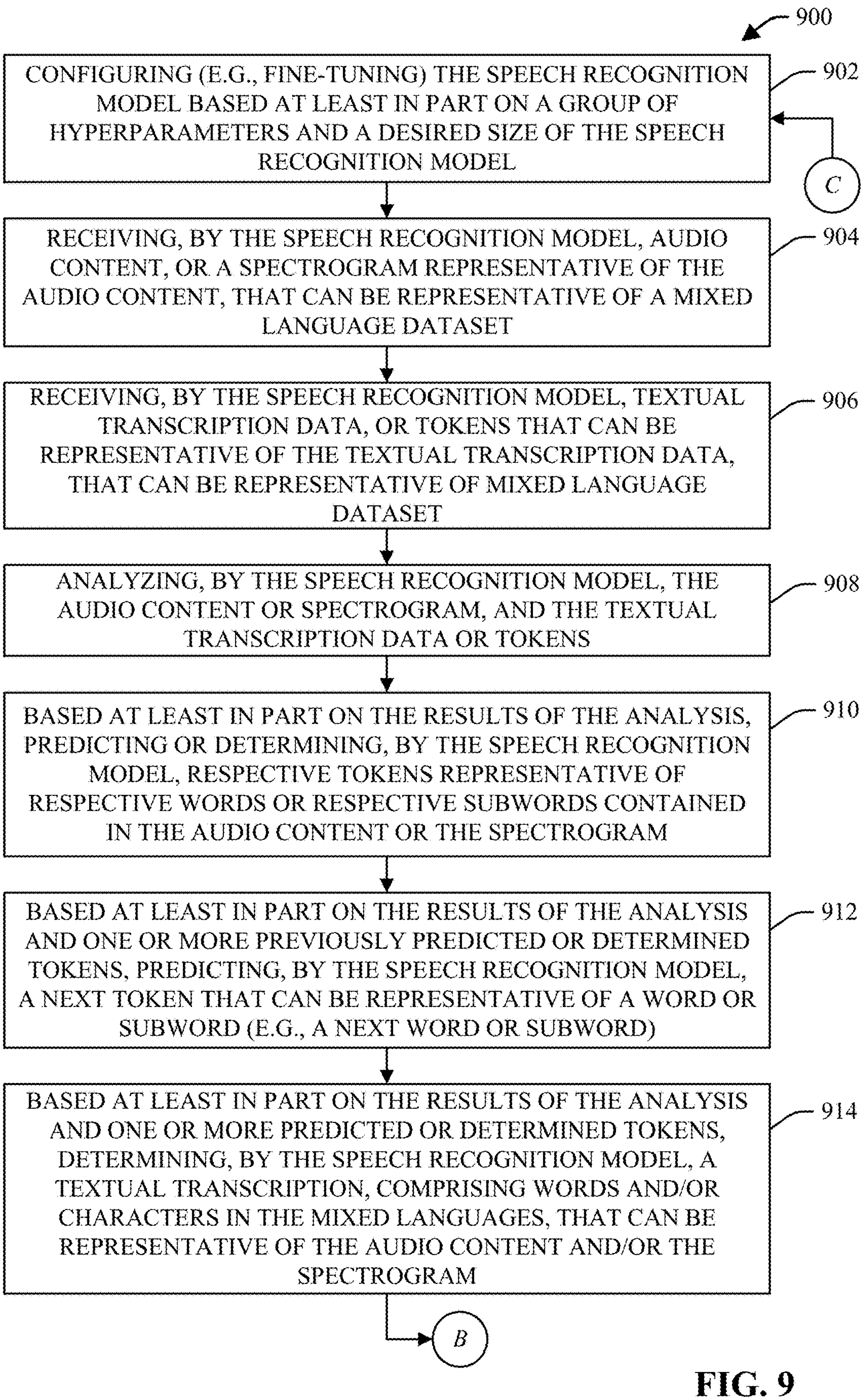
FIGS. 9 and 10 illustrate a flow chart of an example method that can desirably train a speech recognition model based at least in part on information relating to an enhanced mixed language dataset and/or perform an update to facilitate training of the speech recognition model based at least in part on a FAL evaluation, in accordance with various aspects and embodiments of the disclosed subject matter.
Figure 10:
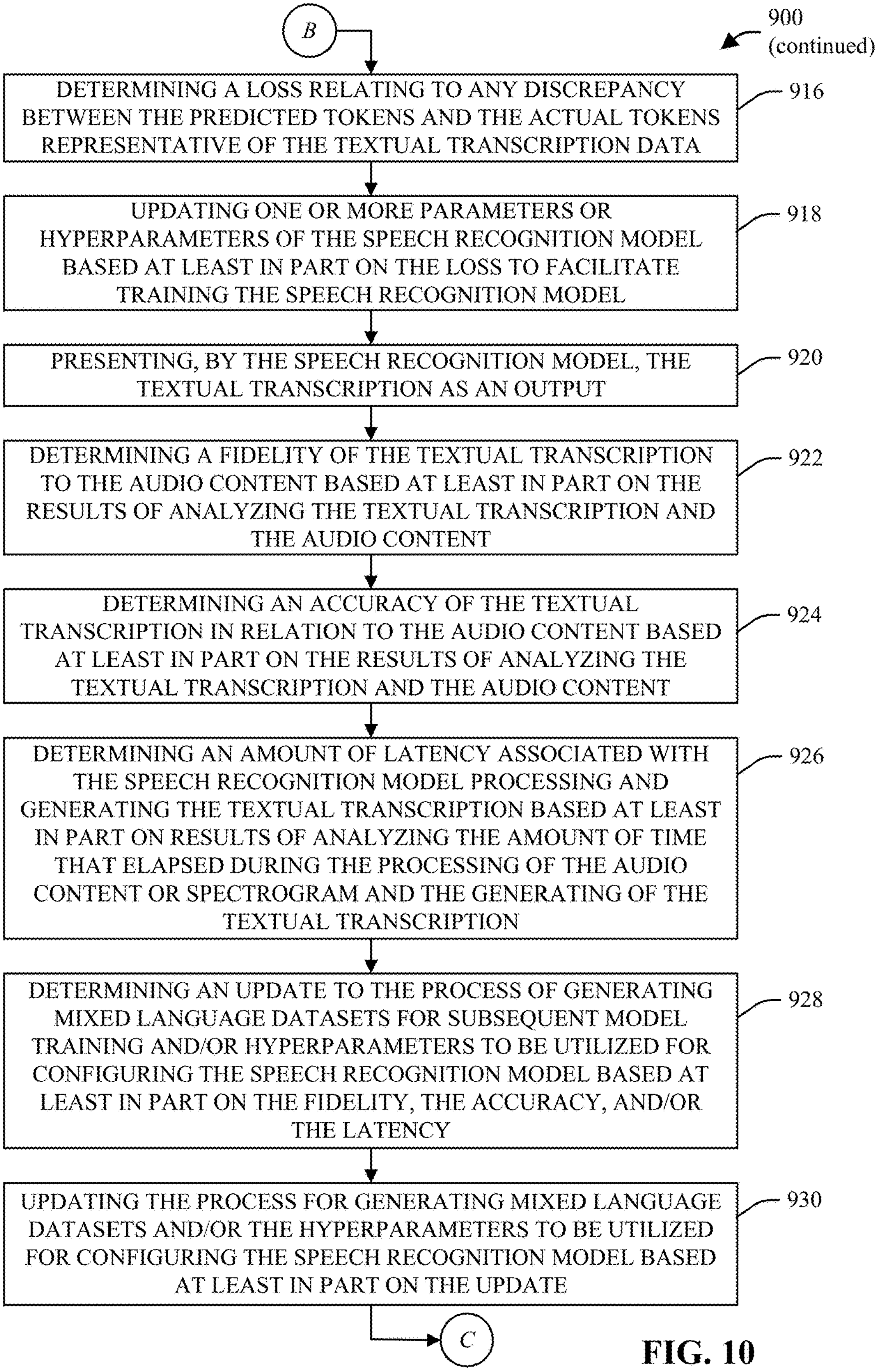

FIGS. 9 and 10 illustrate a flow chart of an example method 900 that can desirably (e.g., automatically, dynamically, suitably, reliably, efficiently, enhancedly, and/or optimally) train a speech recognition model (e.g., a mixed language speech recognition model) based at least in part on information relating to an enhanced mixed language dataset and/or perform an update to facilitate training of the speech recognition model based at least in part on a FAL evaluation, in accordance with various aspects and embodiments of the disclosed subject matter. The method 900 can be employed by, for example, a system comprising the model manager component, the trained model (e.g., trained GPT-4 model or other type of trained AI-based model), the MLDGM component, the FAL evaluator component, the speech recognition component (e.g., comprising the mixed language speech recognition model), the fine tuner component, and/or another component that respectively can comprise or be associated with processor components, data stores, and/or other components. The trained model can comprise or be associated with the MLDGM component and the FAL evaluator component. In some embodiments, the speech recognition component can comprise or employ the speech recognition model, such as described herein. The model manager component can manage (e.g., control) the performance of the various operations of the method 900.

At 902, the speech recognition model can be configured (e.g., fine-tuned) based at least in part on a group of hyperparameters and a desired size of the speech recognition model. The fine tuner component can communicate or apply the group of hyperparameters and/or a group of parameters to the speech recognition model (e.g., the mixed language speech recognition model) to facilitate configuring (e.g., fine tuning) the model, wherein the group of hyperparameters can be determined and/or selected based at least in part on the desired size (e.g., tiny, base, small, medium, or large) of the speech recognition model. The speech recognition model can receive the information relating to the group of hyperparameters and/or the group of parameters, and can be configured based at least in part on the group of hyperparameters and/or the group of parameters. In some embodiments, the speech recognition model can be pre-trained or initially trained, such as described herein.

At 904, audio content, or a spectrogram (e.g., log-mel spectrogram) representative of the audio content, that can be representative of a mixed language dataset can be received by the speech recognition model. The mixed language dataset can be an enhanced mixed language dataset that can be generated by the mixed language data generation manager component, such as described herein. The mixed language dataset can comprise textual data in at least two languages, wherein respective second items of textual data of a second language (e.g., English or another desired language) can be interspersed between respective first items of textual data of a first language (e.g., Cantonese or another desired language different from the second language). The textual data can be labeled (e.g., identified, tagged, or labeled) speech data to facilitate training of the mixed language speech recognition model. In certain embodiments, the audio converter component can generate the spectrogram representative of the audio content based at least in part on the results of analyzing the audio content. The model manager component can manage inputting or applying of the audio content or the spectrogram to the speech recognition model, which can receive the audio content or the spectrogram. For instance, the audio converter component (e.g., as managed by the model manager component) can input or apply the spectrogram to the speech recognition model.

At 906, textual transcription data, or tokens that can be representative of the textual transcription data, that can be representative of a mixed language dataset can be received by the speech recognition model. The textual transcription data or tokens can be representative of the labeled speech data of the mixed language dataset. The model manager component can input or apply, and/or can manage inputting or applying of, the textual transcription data or tokens to the speech recognition model, which can receive the textual transcription data or tokens.

At 908, the speech recognition model can analyze (e.g., perform an AI-based analysis on) the audio content or spectrogram, and the textual transcription data or tokens. In some embodiments, the speech recognition model can analyze the audio content or spectrogram, and the textual transcription data or tokens, simultaneously, concurrently, or in parallel.

At 910, based at least in part on the results of the analysis, the speech recognition model can predict or determine respective tokens representative of respective words or respective subwords contained in the audio content or the spectrogram. At 912, based at least in part on the results of the analysis and one or more previously predicted or determined tokens, the speech recognition model can predict a next token that can be representative of a word or subword (e.g., a next word or subword in a sequence of words or subwords presented or contained in the audio content or spectrogram). At 914, based at least in part on the results of the analysis and one or more predicted or determined tokens, the speech recognition model can determine a textual transcription, comprising words and/or characters (e.g., transcribed words and/or characters) in the mixed languages, that can be representative of the audio content and/or the spectrogram. In some embodiments, as part of the analysis, the speech recognition model can employ an encoder component that can process and encode the audio content or spectrogram to generate encoded data, and a decoder component that can decode the encoded data to predict or determine tokens, predict next tokens, and/or generate the textual transcription representative of the encoded data and correspondingly representative of the audio content and/or spectrogram, such as described herein. At this point, the method 900 can proceed to reference point B, wherein the method 900 can proceed from reference point B as depicted in FIG. 10 and described herein.

At 916, a loss relating to any discrepancy between the predicted tokens and the actual tokens representative of the textual transcription data can be determined. A loss component of or associated with the speech recognition model can determine (e.g., calculate) the loss (e.g., a loss function) relating to any discrepancy between the predicted tokens (e.g., predicted by the model) and the actual tokens representative of the textual transcription data.

At 918, one or more parameters or hyperparameters of the speech recognition model can be updated based at least in part on the loss to facilitate training (e.g., fine tuning, further training, or refining training of) the speech recognition model. The update component or the loss component (or another component of or associated with the model) can determine an update, comprising one or more modified parameters or hyperparameters, based at least in part on the loss, such as described herein. The update component or the loss component (or another component of or associated with the model) can update (e.g., modify) or facilitate updating the speech recognition model (e.g., reconfiguring the model) based at least in part on the update (e.g., the one or more modified parameters or hyperparameters) to facilitate training the speech recognition model, such as described herein.

At 920, the speech recognition model can present the textual transcription as an output. Based at least in part on the determination of the textual transcription, the speech recognition model can present the textual transcription, comprising the words and/or characters (e.g., the transcribed words and/or characters) in the mixed languages, as an output.

At 922, a fidelity of the textual transcription to the audio content can be determined based at least in part on the results of analyzing the textual transcription and the audio content. For instance, the FAL evaluator component can analyze (e.g., evaluate) the textual transcription (e.g., at least a portion of the textual transcription) and the audio content (e.g., at least a portion of the audio content that corresponds to the portion of the textual transcription), and based at least in part on the results of the analysis, the FAL evaluator component can determine (e.g., calculate) the fidelity (e.g., a fidelity score, rating, or value) that can indicate how well (e.g., how accurately) the speech recognition model captures the content (e.g., speech content, such as spoken words) and meaning of the original audio content (e.g., spoken words (e.g., by speakers) corresponding to the enhanced mixed language dataset) with regard to the intended message, tone, and context of the spoken content (e.g., spoken words) of the audio content to ensure that the textual transcription retains the intended message, tone, and context of the spoken content.

At 924, an accuracy of the textual transcription in relation to the audio content can be determined based at least in part on the results of analyzing the textual transcription and the audio content. For instance, based at least in part on the results of the analysis, the FAL evaluator component can determine (e.g., calculate or measure) the accuracy (e.g., an accuracy score, rating, or value) or correctness of the textual transcription in relation to (e.g., as compared to) the spoken words in the audio content. The determination or measurement of the accuracy of the textual transcription can involve the FAL evaluator component evaluating the ability of the speech recognition model to accurately (e.g., correctly) recognize and convert spoken words (or tokens representative thereof) into textual data (e.g., written text), including accurate representation of tones and pronunciation associated with the respective languages of the multiple, mixed languages in the audio content.

At 926, an amount of latency associated with the speech recognition model processing and generating the textual transcription representative of the audio content can be determined based at least in part on results of analyzing the amount of time that elapsed during the processing of the audio content or spectrogram and the generating of the textual transcription. The FAL evaluator component can determine (e.g., calculate, track, or otherwise determine) the amount of latency, and/or a corresponding latency score, rating, or value, associated with the speech recognition model processing the audio content or spectrogram, and generating the textual transcription representative of the audio content based at least in part on the results of the analysis of the amount of time that elapsed during the processing and the generating. By determining the latency, the FAL evaluator component can evaluate and determine the speed, responsiveness, and efficiency of the speech recognition model in generating textual transcriptions representative of audio content (e.g., spoken words).

At 928, an update to the process of generating mixed language datasets for subsequent model training and/or hyperparameters to be utilized for configuring the speech recognition model can be determined based at least in part on the fidelity, the accuracy, and/or the latency. In some embodiments, the FAL evaluator component (or another component, such as an update component, of or associated with the MLDGM component) can determine the update (e.g., update information) to the process of generating mixed language datasets and/or the hyperparameters or parameters to be utilized for configuring the speech recognition model based at least in part on the fidelity, the accuracy, and/or the latency (e.g., the fidelity score, the accuracy score, and/or the latency score), such as described herein.

At 930, the process for generating mixed language datasets and/or the hyperparameters to be utilized for configuring the speech recognition model can be updated based at least in part on the update. The FAL evaluator component (or another component, such as the update component, of or associated with the MLDGM component) can update the process for generating mixed language datasets and/or the hyperparameters (and/or the parameters) for configuring the speech recognition model based at least in part on the update. In some embodiments, if the update involves an update to a hyperparameter(s) and/or the parameters of the speech recognition model, the FAL evaluator component (or the other component) can reconcile such update to the hyperparameter(s) and/or the parameter(s) with any other update to the hyperparameter(s) and/or the parameter(s) (if any) determined by the speech recognition component (e.g., the update component or the loss component of the speech recognition component) to facilitate determining a desired uniform update to the hyperparameter(s) and/or the parameter(s) to be utilized for configuring (e.g., reconfiguring or fine tuning) the speech recognition model. The MLDGM component, employing the updated process, can determine and generate another mixed language dataset (e.g., another further enhanced mixed language dataset) that can be used as input to the speech recognition model, and/or the fine tuner component can configure or facilitate configuring the hyperparameter(s) and/or other parameter(s) (e.g., updated hyper parameter(s) and/or other parameter(s)) of the speech recognition model, as part of another iteration of training of the speech recognition model. In certain embodiments, the method 900 can return back to reference numeral 902 (e.g., via reference point C), wherein one or more iterations of the method 900 can be performed (e.g., by the MLDGM component, the fine tuner component, the speech recognition component, the speech recognition model, the FAL evaluator component, and/or other component) to facilitate training (e.g., further training or refining training of) the speech recognition model.

Figure 11:
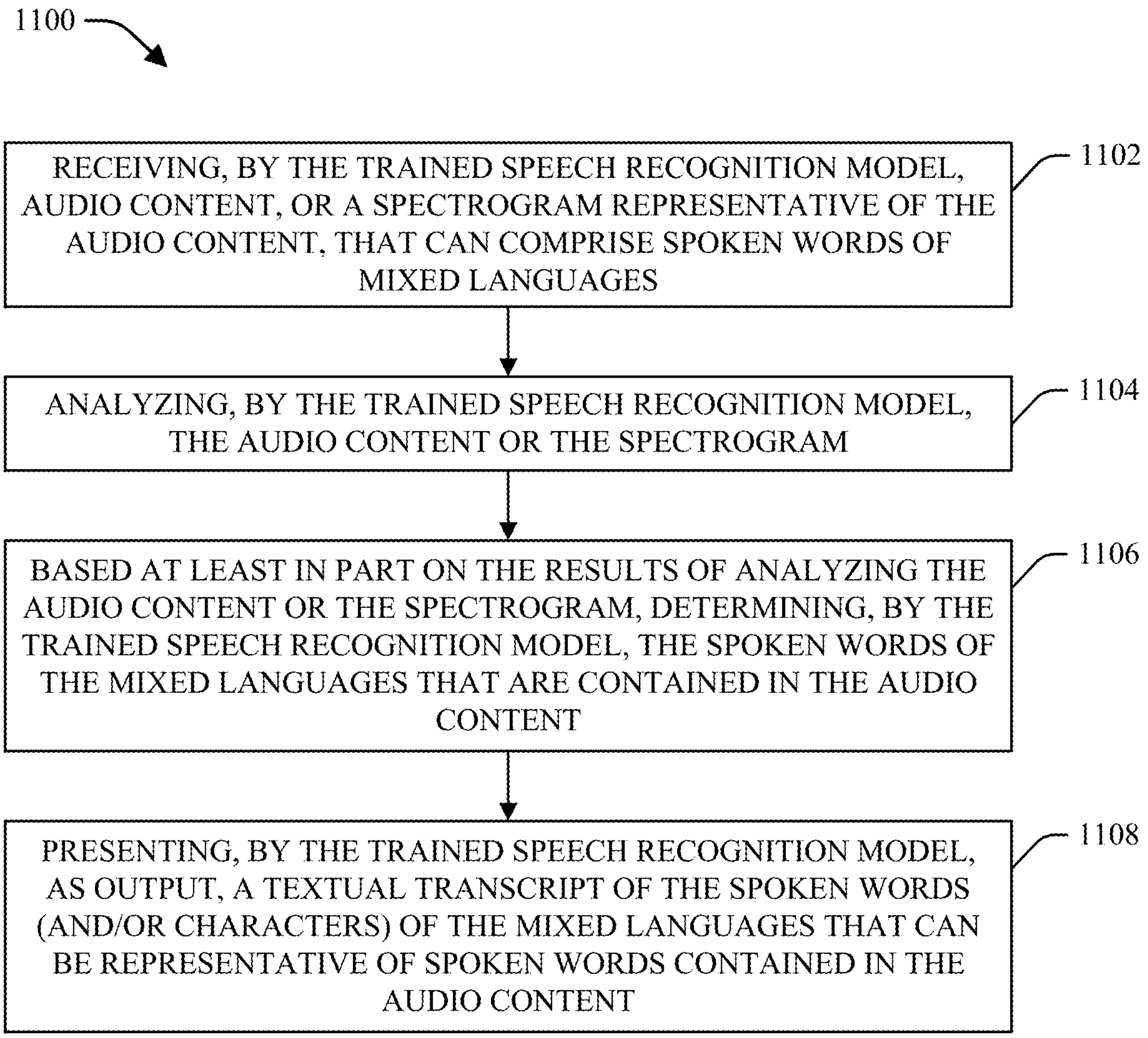
FIG. 11 depicts a flow chart of an example method that can desirably perform speech recognition and speech-to-text of mixed language speech, in accordance with various aspects and embodiments of the disclosed subject matter.

FIG. 11 depicts a flow chart of an example method 1100 that can desirably (e.g., automatically, dynamically, suitably, reliably, efficiently, enhancedly, and/or optimally) perform speech recognition and speech-to-text of mixed language speech (e.g., perform ASR on mixed language speech), in accordance with various aspects and embodiments of the disclosed subject matter. The method 1100 can be employed by, for example, a system comprising the trained speech recognition model (e.g., trained mixed language speech recognition model) and/or the model manager component that can comprise or be associated with the processor component, the data store, and/or other components. In some embodiments, the model manager component can manage (e.g., control) the performance of the various operations of the method 1100.

At 1102, audio content, or a spectrogram (e.g., log-mel spectrogram) representative of the audio content, that can comprise spoken words of mixed languages can be received by the trained speech recognition model. The audio content can, for example, comprise spoken words with respective first words being in a first language and respective second words being in a second language, wherein the respective second words can be interspersed with (e.g., interposed between, commingled or intermingled between) the respective first words.

At 1104, the audio content or the spectrogram can be analyzed by the trained speech recognition model. At 1106, based at least in part on the results of analyzing (e.g., performing an AI-based analysis on) the audio content or the spectrogram, the trained speech recognition model can determine (e.g., recognize) the spoken words of the mixed languages that are contained in the audio content. At 1108, the trained speech recognition model can present (e.g., generate and present), as output, a textual transcript of the spoken words (and/or characters) of the mixed languages that can be representative of spoken words contained in the audio content.

Figure 12:
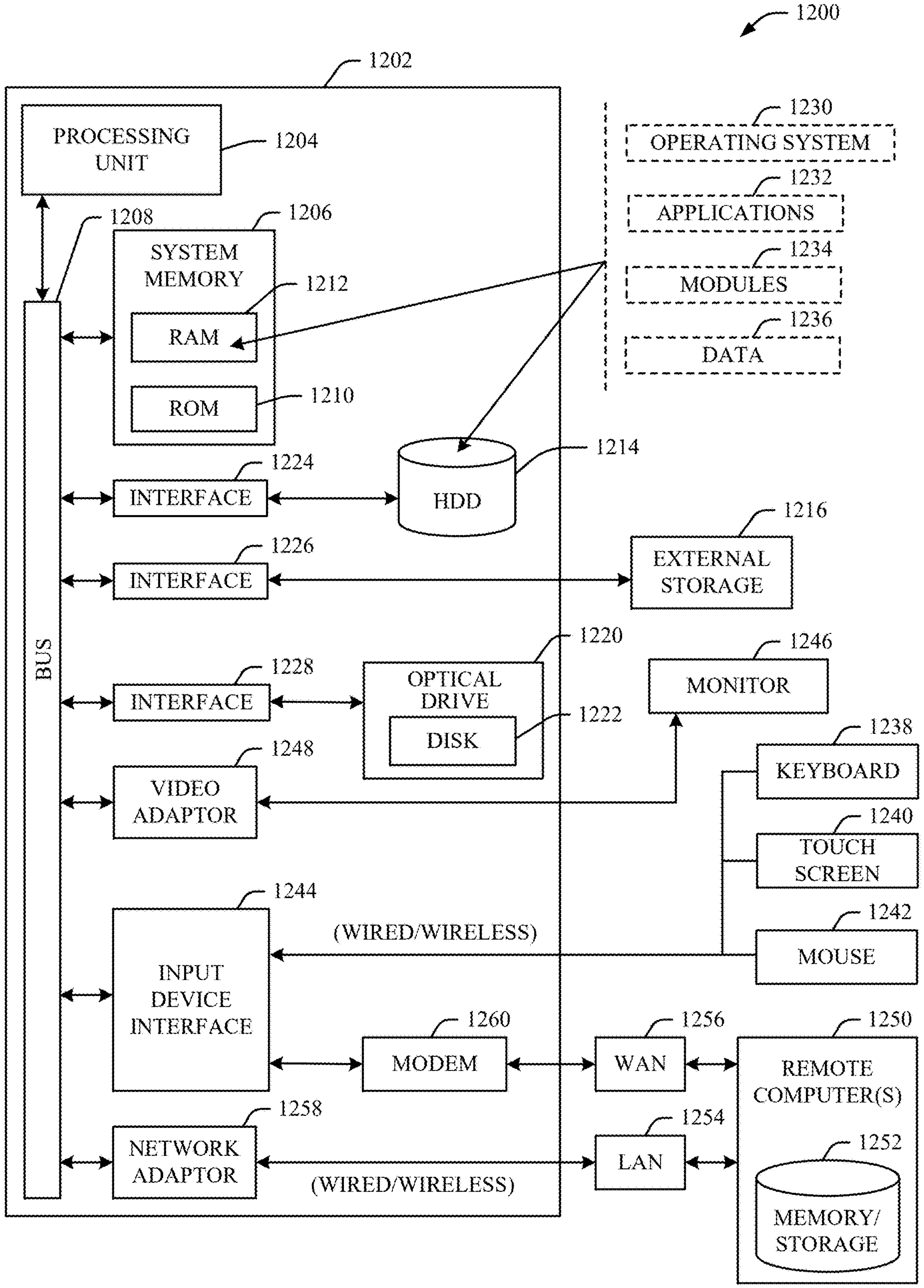
FIG. 12 illustrates an example block diagram of an example computing environment in which the various embodiments of the embodiments described herein can be implemented.

In order to provide additional context for various embodiments described herein, FIG. 12 and the following discussion are intended to provide a brief, general description of a suitable computing environment 1200 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 also can be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the. NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256, e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term “article of manufacture” as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term “processor” can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as “store,” “storage,” “data store,” data storage,” “database,” and substantially any other information storage component relevant to operation and functionality of a component are utilized to refer to “memory components,” entities embodied in a “memory,” or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

A communication device, such as described herein, can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, or other type of electronic headwear or bodywear), a set-top box, an Internet Protocol (IP) television (IPTV), IoT device (e.g., medical device, electronic speaker with voice controller, camera device, security device, tracking device, appliance, or other IoT device), or other desired type of communication device.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., model manager component, model or trained model, speech recognition component, speech recognition model, device, MLDGM component, FAL evaluator component, audio recorder component, AI component, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:

generating, by a trained model of a system comprising at least one processor, mixed language data based on instruction data relating to mixed language data generation and seed topic data relating to a group of seed topics, wherein the mixed language data comprises respective first textual words in a first language and respective second textual words in a second language that are determined based on respective simulated conversations between respective simulated speakers, and wherein the respective second textual words are interspersed with the respective first textual words; and as part of training of a speech recognition model, determining, by the trained model of the system, quality metrics indicative of a speech recognition performance of the speech recognition model in recognizing information relating to spoken mixed language words representative of the mixed language data, and generating textual transcript mixed language words representative of the spoken mixed language words, wherein the quality metrics are indicative of a fidelity, an accuracy, and a latency relating to the speech recognition performance.

2. The method of claim 1, further comprising:

based on results of analyzing the textual transcript mixed language words, a transcript of the mixed language data, or information relating to audio content comprising the spoken mixed language words:

determining, by the trained model of the system, a fidelity metric value indicative of the fidelity of the textual transcript mixed language words to the audio content comprising the spoken mixed language words;

determining, by the trained model of the system, an accuracy metric value indicative of the accuracy of the textual transcript mixed language words relative to the spoken mixed language words; and determining, by the trained model of the system, a latency metric value indicative of the latency associated with the recognizing of the spoken mixed language words and the generating of the textual transcript mixed language words by the speech recognition model.

3. The method of claim 2, further comprising:

in connection with an iteration of the training of the speech recognition model, determining, by the trained model of the system, an update, comprising update information, relating to the training of the speech recognition model, based on the fidelity metric value, the accuracy metric value, or the latency metric value, in accordance with a defined model management criterion; and in connection with a subsequent iteration of the training of the speech recognition model, and based on the update information, initiating, by the trained model of the system, modification of a hyperparameter of the speech recognition model, a first parameter of the speech recognition model, a second parameter of the trained model, or a third parameter relating to the mixed language data generation, or a process relating to the mixed language data generation.

4. The method of claim 1, wherein a second portion of the respective second textual words are interspersed with a first portion of the respective first textual words within a same sentence.

5. The method of claim 1, wherein the respective first textual words comprise respective characters associated with the first language.

6. The method of claim 1, further comprising:

collecting, by the trained model of the system, respective items of content from respective data sources, based on the instruction data and the seed topic data, wherein the respective items of content comprise respective textual words in respective languages;

extracting, by the trained model of the system, topics and keywords from the respective items of content based on a first result of analyzing the respective items of content; and simulating, by the trained model of the system, the respective simulated conversations, comprising respective spoken conversation words relating to the topics and the keywords, between the respective simulated speakers based on a second result of analyzing the topics and the keywords, wherein the respective spoken conversation words comprise a first portion of the respective first textual words in the first language and a second portion of the respective second textual words in the second language.

7. The method of claim 6, further comprising:

evaluating, by the trained model of the system according to a defined performance metric and a defined efficacy metric, a performance and an efficacy relating to obtaining of the respective items of content by one or more web crawler devices in connection with the collecting;

determining, by the trained model of the system, content collection update data or feedback data based on the evaluating of the performance and the efficacy; and initiating, by the trained model of the system, modification of at least one of subsequent collection of respective subsequent items of content from at least some of the respective data sources or operation of the one or more web crawler devices.

8. The method of claim 6, further comprising:

evaluating, by the trained model of the system according to a grammar metric, a diction metric, or a coherence metric, grammar, a diction, or a coherence of the respective simulated conversations based on a first result of analyzing the respective simulated conversations, wherein the respective simulated conversations comprise the respective first textual words and the respective second textual words, and wherein the respective simulated conversations are associated with an iteration of the training of the speech recognition model;

ranking, by the trained model of the system, respective items of textual data of the respective simulated conversations based on a second result of the evaluating;

based on the ranking, from the respective items of textual data, determining, by the trained model of the system, higher performing items of textual data that are ranked higher than lower performing items of textual data with regard to the grammar, the diction, or the coherence;

determining, by the trained model of the system, prompt update information based on the higher performing items of textual data; and modifying, by the trained model of the system, one or more conversation prompts relating to simulation of the respective simulated conversations between the respective simulated speakers to facilitate utilization of one or more modified conversation prompts during simulation of respective subsequent simulated conversations between the respective simulated speakers in connection with generating subsequent mixed language data for use in a subsequent iteration of the training of the speech recognition model.

9. The method of claim 1, further comprising:

initiating, by the system, setting of hyperparameters and parameters of the speech recognition model;

generating, by the system, a log-mel spectrogram, comprising spectrogram information, representative of audio content, comprising the spoken mixed language words representative of the mixed language data, based on a first result of analyzing the audio content;

generating, by the system, respective tokens representative of respective textual words or respective textual subwords of the mixed language data, based on a second result of analyzing the mixed language data, wherein the respective textual words comprise the respective first textual words in the first language and the respective second textual words in the second language, and wherein the respective textual subwords are respective portions of some of the respective textual words; and initiating, by the system, inputting the log-mel spectrogram and the respective tokens into the speech recognition model to facilitate performance of speech recognition on the log-mel spectrogram and the training of the speech recognition model.

10. The method of claim 9, wherein the speech recognition model encodes the spectrogram information to generate encoded information representative of the spectrogram information based on analyzing the spectrogram information, and wherein the speech recognition model decodes the encoded information to predict respective decoding tokens representative of the respective textual words, comprising the respective first textual words in the first language and the respective second textual words in the second language.

11. The method of claim 10, wherein the speech recognition model generates a speech recognition transcript, comprising the textual transcript mixed language words, based on the decoding tokens, and wherein the textual transcript mixed language words is representative of the spoken mixed language words and is representative of the respective textual words, comprising the respective first textual words in the first language and the respective second textual words in the second language.

12. The method of claim 10, wherein the speech recognition model predicts a next decoding token of the respective decoding tokens based on previous decoding tokens of the respective decoding tokens and an analysis of the encoded information, and wherein the next decoding token is associated with a next spoken word or a next spoken subword of the spoken mixed language words.

13. A system, comprising:

at least one memory that stores computer executable components; and at least one processor that executes computer executable components stored in the at least one memory, wherein the computer executable components comprise:

a mixed language data generator that determines and generates mixed language data based on instruction information relating to mixed language data generation and seed topic information relating to a group of seed topics, wherein the mixed language data comprises respective first textual words in a first language and respective second textual words in a second language that are determined based on respective simulated conversations between respective simulated speakers, and wherein the respective second textual words are commingled with the respective first textual words; and an evaluator that determines, in connection with training of a speech recognition model, quality metric values indicative of a speech recognition performance of the speech recognition model in recognizing information relating to spoken mixed language words representative of the mixed language data, and generating textual transcript mixed language words representative of the spoken mixed language words, wherein the quality metric values relate to a fidelity, an accuracy, and a latency associated with the speech recognition performance of the speech recognition model.

14. The system of claim 13, wherein the computer executable components further comprise a trained model that comprises or is associated with the mixed language data generator or the evaluator.

15. The system of claim 14, wherein at least one of the trained model or the speech recognition model comprises or utilizes an accelerator unit, a graphics processing unit, or an application specific integrated circuit.

16. The system of claim 14, wherein the quality metric values comprise a fidelity metric value, an accuracy metric value, and a latency metric value, wherein the fidelity metric value indicates the fidelity of the textual transcript mixed language words to audio content comprising the spoken mixed language words, the accuracy metric value indicates the accuracy of the textual transcript mixed language words relative to the spoken mixed language words, and the latency metric value indicates the latency associated with recognition of the spoken mixed language words and generation of the textual transcript mixed language words by the speech recognition model, wherein, in connection with an iteration of the training of the speech recognition model, the trained model or the evaluator determines an update, comprising update information, relating to the training of the speech recognition model, based on the fidelity metric value, the accuracy metric value, or the latency metric value, in accordance with a defined model management criterion, and wherein, in connection with a next iteration of the training of the speech recognition model, and based on the update information, the trained model or the evaluator facilitates adjustment of a hyperparameter of the speech recognition model, a first parameter of the speech recognition model, a second parameter of the trained model, or a third parameter relating to the mixed language data generation, or a performance of an operation by the mixed language data generator relating to the mixed language data generation.

17. The system of claim 14, wherein the mixed language data generator or the trained model employs a content collector that obtains respective items of content from respective data sources, based on the instruction information and the seed topic information, wherein the respective items of content comprise respective textual words in respective languages, wherein the mixed language data generator or the trained model employs a manager agent that extracts topics and keywords from the respective items of content based on a first result of a first analysis of the respective items of content, wherein the mixed language data generator or the trained model employs a speaker agent that simulates the respective simulated conversations, comprising respective spoken conversation words relating to the topics and the keywords, between the respective simulated speakers based on a second result of a second analysis of the topics and the keywords, and wherein the respective spoken conversation words comprise a first portion of the respective first textual words in the first language and a second portion of the respective second textual words in the second language commingled with the first portion of the respective first textual words within a same sentence.

18. The system of claim 13, wherein the computer executable components further comprise:

a fine tuner that facilitates configuration of hyperparameters and parameters of the speech recognition model;

an audio converter that generates a spectrogram, comprising spectrogram data, representative of audio content, comprising the spoken mixed language words representative of the mixed language data, based on a first result of a first analysis of the audio content; and a tokenizer that generates respective tokens representative of respective textual words or respective textual subwords of the mixed language data, based on a second result of a second analysis of the mixed language data, wherein the respective textual words comprise the respective first textual words in the first language and the respective second textual words in the second language, wherein the respective textual subwords are respective portions of some of the respective textual words, and wherein the audio converter facilitates input of the spectrogram into the speech recognition model and the tokenizer facilitates input of the respective tokens into the speech recognition model to facilitate performance of speech recognition on the spectrogram and the training of the speech recognition model based on the spectrogram and the respective tokens.

19. A non-transitory machine-readable medium, comprising executable instructions that, when executed by at least one processor, facilitate performance of operations, comprising:

determining mixed language data based on instruction data relating to mixed language data generation and seed topic data relating to a group of seed topics, wherein the mixed language data comprises respective first textual words in a first language and respective second textual words in a second language that are determined based on respective emulated conversations between respective emulated speakers, and wherein the respective second textual words are intermingled with the respective first textual words within a same sentence; and in connection with training of a speech recognition model, determining quality metric rating values indicative of a speech recognition performance of the speech recognition model in recognizing information relating to spoken mixed language words representative of the mixed language data, and generating textual transcript mixed language words representative of the spoken mixed language words, wherein the quality metric rating values are representative of a fidelity, an accuracy, and a latency associated with the speech recognition performance of the speech recognition model.

20. The non-transitory machine-readable medium of claim 19, wherein the quality metric rating values comprise a fidelity metric rating value, an accuracy metric rating value, and a latency metric rating value, and wherein the determining of the quality metric rating values comprises:

based on results of analyzing the textual transcript mixed language words, a transcript of the mixed language data, or information relating to audio content comprising the spoken mixed language words:

determining the fidelity metric rating value representative of the fidelity of the textual transcript mixed language words to the audio content comprising the spoken mixed language words;

determining the accuracy metric rating value representative of the accuracy of the textual transcript mixed language words relative to the spoken mixed language words; and determining the latency metric rating value representative of the latency associated with the recognizing of the spoken mixed language words and the generating of the textual transcript mixed language words by the speech recognition model.

* * * * *